(12) United States Patent
Kawata et al.

(10) Patent No.: US 6,338,808 B1
(45) Date of Patent: Jan. 15, 2002

(54) LIQUID CRYSTAL COMPOSITION COMPRISING LIQUID CRYSTAL MOLECULES AND ALIGNMENT PROMOTER

(75) Inventors: Ken Kawata; Shigeki Yokoyama, both of Minami-ashigara; Mitsuyoshi Ichihashi, Fujinomiya; Koushin Matsuoka; Hiroshi Takeuchi, both of Minami-ashigara, all of (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/539,900

(22) Filed: Mar. 31, 2000

(30) Foreign Application Priority Data

| Mar. 31, 1999 | (JP) | ............................................ 11-091291 |
| Mar. 9, 2000 | (JP) | ............................................ 12-064507 |
| Mar. 24, 2000 | (JP) | ............................................ 12-084445 |

(51) Int. Cl.$^7$ ............................................. C09K 19/56
(52) U.S. Cl. ...................................... 252/299.4; 428/1.2
(58) Field of Search ......................... 252/299.4; 428/1.2

(56) References Cited

U.S. PATENT DOCUMENTS 3,848,966 A * 11/1974 Smith et al. ............. 252/299.4
4,022,934 A * 5/1977 Miller ..................... 252/299.4
5,750,050 A * 5/1998 Goodby et al. ........ 252/299.62

FOREIGN PATENT DOCUMENTS

| JP | 54-103795 | * | 8/1979 |
| JP | 09-230354 | * | 9/1997 |
| JP | 2000345164 A | * | 12/2000 |

OTHER PUBLICATIONS

CAPLUS 1995: 991736.*

* cited by examiner

Primary Examiner—Shean C. Wu
(74) Attorney, Agent, or Firm—Burns, Doane, Swecker & Mathis, LLP

(57) ABSTRACT

A liquid crystal composition comprises liquid crystal molecules and an alignment promoter. The alignment promoter is represented by the formula (I).

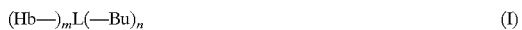

$$(\text{Hb}\text{—})_m\text{L}(\text{—Bu})_n \qquad (\text{I})$$

In the formula (I), Hb is a hydrophobic group selected from the group consisting of a fluorine-substituted alkyl group having 1 to 40 carbon atoms, a fluorine-substituted aryl group having 6 to 40 carbon atoms, an alkyl group having 6 to 60 carbon atoms and an alkyl-substituted oligosiloxanoxy group having 1 to 60 carbon atoms. Bu is a bulky group showing an excluded volume effect and comprising at least two rings. L is an (m+n)-valent linking group. Each of m and n is independently an integer of 1 to 12.

14 Claims, No Drawings

LIQUID CRYSTAL COMPOSITION COMPRISING LIQUID CRYSTAL MOLECULES AND ALIGNMENT PROMOTER

FIELD OF THE INVENTION

The present invention relates to a liquid crystal composition comprising liquid crystal molecules and an alignment promoter. The invention also relates to an optically anisotropic element.

BACKGROUND OF THE INVENTION

A liquid crystal display of transmission type comprises a liquid crystal cell and two polarizing elements placed on both sides of the cell. A display of reflection type comprises a reflection board, a liquid crystal cell and one polarizing element in this order.

The liquid crystal cell comprises a pair of substrates, rod-like liquid crystal molecules and an electrode layer. The rod-like liquid crystal molecules are provided between the substrates. The electrode layer has a function of applying a voltage to the rod-like liquid crystal molecules. Each of the substrates has an orientation layer, which has a function of aligning the rod-like liquid crystal molecules. Since the rod-like liquid crystal molecules are placed between the orientation layers, the alignment of the liquid crystal is easily controlled by the orientation layers.

An optical compensatory sheet (phase retarder) is often provided between the cell and the polarizing element to enlarge a viewing angle of the display. The optical compensatory sheet has another function of removing undesirable color from a displayed image. A stretched birefringent film has been usually used as the optical compensatory sheet. An optically anisotropic element has recently been proposed as an optical compensatory sheet in place of the stretched birefringent film. The optically anisotropic element comprises a transparent support and an optically anisotropic layer.

The optically anisotropic layer comprises aligned liquid crystal molecules that are aligned and polymerized while keeping alignment. The liquid crystal molecules are aligned by one orientation layer provided between the transparent support and the optically anisotropic layer.

SUMMARY OF THE INVENTION

It is difficult to align liquid crystal molecules uniformly (i.e., to orient the molecules in monodomain alignment) from an interface facing the orientation layer to the opposite interface facing air by using only one orientation layer. If the liquid crystal molecules are not uniformly aligned, disclination arises to scatter light.

An object of the present invention is to provide a liquid crystal composition in which liquid crystal molecules can easily be aligned uniformly.

Another object of the invention is to provide an optically anisotropic element in which liquid crystal molecules are uniformly aligned near an interface having no orientation layer.

A further object of the present invention is to provide a fluorine compound which can be used as an alignment promoter effectively controlling the alignment of liquid crystal molecules.

The present invention provides a liquid crystal composition comprising liquid crystal molecules and an alignment promoter represented by the formula (I) in an amount of 0.01 to 20 wt. % based on the amount of the liquid crystal molecules:

$$(Hb-)_m L(-Bu)_n \quad (I)$$

in which Hb is a hydrophobic group selected from the group consisting of a fluorine-substituted alkyl group having 1 to 40 carbon atoms, a fluorine-substituted aryl group having 6 to 40 carbon atoms, an alkyl group having 6 to 60 carbon atoms and an alkyl-substituted oligosiloxanoxy group having 1 to 60 carbon atoms; Bu is a bulky group showing an excluded volume effect and comprising at least two rings; L is an (m+n)-valent linking group; and each of m and n is independently an integer of 1 to 12.

The invention also provides an optically anisotropic element which comprises a liquid crystal layer comprising liquid crystal molecules and an orientation layer provided on only one side of the liquid crystal layer, wherein the liquid crystal layer further contains an alignment promoter represented by the formula (I) in an amount of 0.005 to 0.5 g/m².

The invention further provides a fluorine compound represented by the formula (Ia):

$$Hb-L-Bu \quad (Ia)$$

in which Hb is a fluorine-substituted alkyl group having 1 to 40 carbon atoms or a fluorine-substituted aryl group having 6 to 40 carbon atoms; Bu is a bulky group showing an excluded volume effect and comprising a tricyclic condensed ring, a tetracyclic condensed ring or at least two rings combined by a single bond, a vinylene bond or an ethynylene bond; L is a divalent linking group selected from the group consisting of an alkylene group, —O—, —CO—, —NR—, —SO₂— and a combination thereof; and R is hydrogen or an alkyl group.

In the present specification, the term "average inclined angle" means an average of angles between discotic planes of discotic liquid crystal molecules and a surface of the support (or a surface of the orientation layer), or an average of angles between major axes of rod-like liquid crystal molecules and a surface of the support (or a surface of the orientation layer).

The present specification refers to alignment of liquid crystal molecules at an average inclined angle in the range of 50° to 90° as essentially vertical alignment. The specification also refers to alignment of liquid crystal molecules at an average inclined angle in the range of 0° to 50° as horizontal alignment.

In other words, the term "essentially vertical alignment" means homogeneous alignment of discotic liquid crystal molecules or homeotropic alignment of rod-like liquid crystal molecules. In contrast, the term "essentially horizontal alignment" in the specification means homeotropic alignment of discotic liquid crystal molecules or homogeneous alignment of rod-like liquid crystal molecules.

If liquid crystal molecules are placed between a pair of orientation layers (for example, in a liquid crystal cell), the layer of the liquid crystal molecules has no free interface (an interface facing air). In that case, the alignment of the liquid crystal molecules can be controlled relatively with ease. On the other hand, however, if only one orientation layer is used, various alignment defects often appear near the free interface (having no orientation layer). Since force for controlling the alignment is not given near the free interface, it is very difficult to align the liquid crystal molecules uniformly without defects. Further, the alignment near the free interface is often perturbed by influence from outside. For example, solvent of the coating liquid unevenly evaporates from the free interface, or the free interface is blown by air for drying. Consequently, defects of the alignment are liable to appear on the free interface. Dual domain alignment is often observed on the free interface when discotic liquid crystal molecules are aligned vertically (homogeneously). The dual domain alignment comprises two aligning forms in which the discotic planes in one aligning form reversely face to those in the other aligning form though the optical axes are parallel.

The study of the present applicants revealed that the compound defined by the formula (I) has a function of controlling the alignment of liquid crystal molecules, particularly liquid crystal molecules near the free interface when only one orientation layer is used. As shown in the formula (I), the compound comprises a hydrophobic group (Hb) and a bulky group (Bu) showing an excluded volume effect.

The compound of the formula (I) is mixed with liquid crystal, applied on the orientation layer, and thickly distributed near the free interface. For thickly distributing near the free interface, the compound must be incompatible with the liquid crystal so that the phase of the compound may be separated from that of the liquid crystal. The hydrophobic group (Hb) has a function of separating the compound from the liquid crystal phase.

Further, for promoting the alignment of the liquid crystal molecules, the compound must comprise a relatively rigid part having molecular polarization property similar to that of the liquid crystal. The bulky group (Bu) functions as that part.

The applicant considers that the hydrophobic group (Hb) faces the air side while the bulky group (Bu) faces the liquid crystal side, where the compound of the formula (I) is placed near the free interface. If the bulky group (Bu) has a planar structure (for example, comprising a tricyclic or tetracyclic condensed ring), the compound effectively aligns rod-like liquid crystal molecules horizontally. Further, the compound having the bulky group (Bu) of a planar structure also aligns discotic liquid crystal molecules horizontally or vertically according to whether the group (Bu) is hydrophilic or hydrophobic, respectively. If the bulky group (Bu) has a structure comprising a part protruding to the liquid crystal side (for example, a structure comprising at least two rings connected through a single bond, a vinylene bond or an ethynylene bond), the compound vertically aligns both rod-like and discotic liquid crystal molecules.

As is described above, interactions (such as intermolecular electrostatic force of attraction and force of repulsion caused by the excluded volume effect of the bulky group (Bu)) between the liquid crystal molecules and the compound of the formula (I) can be freely controlled by varying the molecular structure, particularly the bulky group (Bu) of the compound. Regardless of the chemical structures of the liquid crystal molecules, the inclined angles of the molecules near the free interface can be freely controlled by appropriately selecting the compound of the formula (I).

Therefore, the liquid crystal molecules even near the free interface having no orientation layer can be uniformly aligned by the alignment promoter represented by the formula (I).

DETAILED DESCRIPTION OF THE INVENTION

Alignment Promoter

The compound represented by the formula (I) is used as the alignment promoter.

$$(Hb-)_m L(-Bu)_n \quad (I)$$

In the formula (I), Hb is a hydrophobic group selected from the group consisting of a fluorine-substituted alkyl group having 1 to 40 carbon atoms, a fluorine-substituted aryl group having 6 to 40 carbon atoms, an alkyl group having 6 to 60 carbon atoms and an alkyl-substituted oligosiloxanoxy group having 1 to 60 carbon atoms. A fluorine-substituted alkyl group having 1 to 40 carbon atoms and a fluorine-substituted aryl group having 6 to 40 carbon atoms are preferred, and a fluorine-substituted alkyl group having 1 to 40 carbon atoms is particularly preferred.

The fluorine-substituted alkyl group may have a cyclic or branched structure. The fluorine-substituted alkyl group has 1 to 40 carbon atoms, preferably 2 to 30 carbon atoms, more preferably 3 to 20 carbon atoms, further preferably 4 to 15 carbon atoms, and most preferably 6 to 12 carbon atoms. The ratio of fluorine atoms substituting hydrogen atoms of the alkyl group is preferably in the range of 50 to 100%, more preferably 60 to 100%, further preferably 70 to 100%, furthermore preferably 80 to 100%, and most preferably 85 to 100%.

The fluorine-substituted aryl group has 6 to 40 carbon atoms. The fluorine-substituted aryl group is preferably a fluorine-substituted phenyl. The ratio of fluorine atoms substituting hydrogen atoms of the aryl group is preferably in the range of 50 to 100%, more preferably 60 to 100%, further preferably 70 to 100%, furthermore preferably 80 to 100%, and most preferably 85 to 100%.

The alkyl group having 6 to 60 carbon atoms may have a cyclic or branched structure. The alkyl group has preferably 7 to 50 carbon atoms, more preferably 8 to 40 carbon atoms, further preferably 9 to 30 carbon atoms and most preferably 10 to 20 carbon atoms.

The alkyl-substituted oligosiloxanoxy group comprises 1 to 60 carbon atoms in total. The alkyl-substituted oligosiloxanoxy group is represented by the following formula:

$$R^1-(SiR^2_2-O)_q-$$

in which $R^1$ is hydrogen, hydroxyl or an alkyl group; $R^2$ is hydrogen or an alkyl group, and at least one of the two groups represented by $R^2$ is an alkyl group; and q is an integer of 2 to 12. $R^1$ preferably is hydroxyl. Each of the two groups represented by $R^2$ preferably is an alkyl group. In the formula, q preferably is an integer of 2 to 8, and more preferably is an integer of 3 to 6.

The alkyl group may have a cyclic or branched structure. The alkyl group preferably has 1 to 12 carbon atoms, more preferably has 1 to 8 carbon atoms, further preferably has 1 to 6 carbon atoms, furthermore preferably has 1 to 4 carbon atoms, and most preferably has 1 or 2 carbon atoms.

Examples of the hydrophobic group (Hb) are shown below.

(Hb-1) $n\text{-}C_8F_{17}-$ (Hb-2) $H-C_8F_{16}-$ (Hb-3) tetrafluorophenyl—

(Hb-4) $H-C_6F_{12}-$ (Hb-5) $H-C_4F_8-$ (Hb-6) $HO-(Si(CH_3)_2-O)_4-$ (Hb-7) $n\text{-}C_{12}H_{25}-$ In the formula (I), Bu is a bulky group showing an excluded volume effect and comprising at least two rings. Each ring may be an aliphatic, aromatic or hetero-cyclic ring. Further, the ring is preferably a five-, six- or seven-membered, more preferably five- or six-membered, and further preferably six-membered ring. The rings may form a condensed ring, or be connected through a spiro bond, a single bond or a divalent linking group. Preferably, they form a condensed ring, or are connected through a single bond or a divalent linking group.

In the case that at least two of the rings form a condensed ring, they preferably form a tricyclic or tetracyclic condensed ring.

In the case that at least two of the rings are connected through a divalent linking group, examples of the linking group include —O—, —CO—, an alkylene group, vinylene bond (—CH=CH—), ethynylene bond (—C≡C—) and a combination thereof. The linking group is preferably vinylene bond or ethynylene bond, and more preferably ethynylene bond.

The ring can have a substituent group. Examples of the substituent group include halogen atom, hydroxyl, cyano, nitro, an alkyl group (preferably comprising 1 to 5 carbon atoms), a substituted alkyl group (e.g., carboxyalkyl group, alkoxyalkyl group), an alkoxy group, a substituted alkoxy group (e.g., oligoalkoxy group), an alkenyloxy group (e.g., vinyloxy), an acyl group (e.g., acryloyl, methacryloyl), an acyloxy group (e.g., acryloyloxy, benzoyloxy) and an epoxy group (e.g., epoxyethyl).

Examples of the bulky group (Bu) showing an excluded volume effect are shown below.

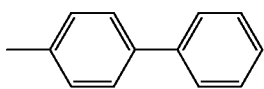

(Bu-1)

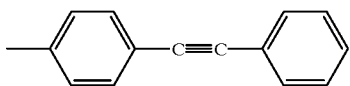

(Bu-2)

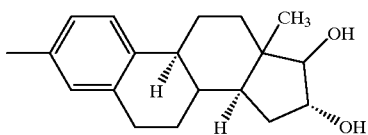

(Bu-3)

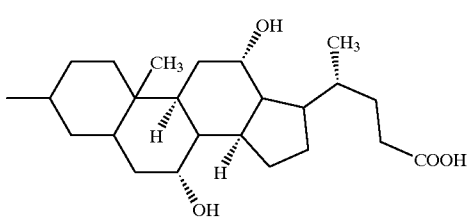

(Bu-4)

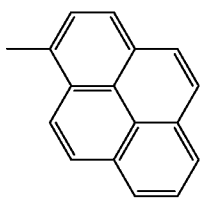

(Bu-5)

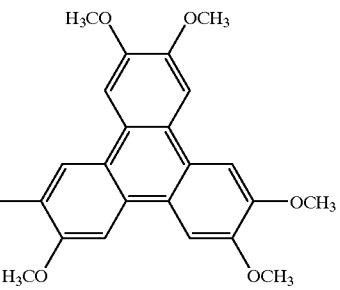

(Bu-6)

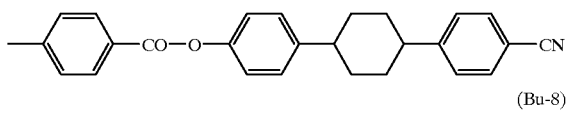

(Bu-7)

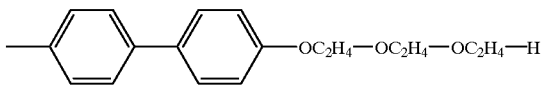

(Bu-8)

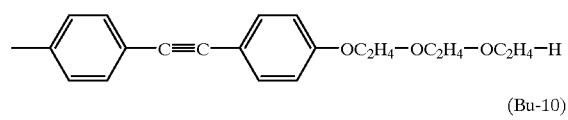

(Bu-9)

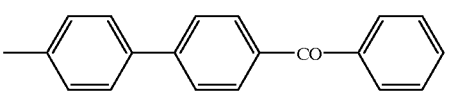

(Bu-10)

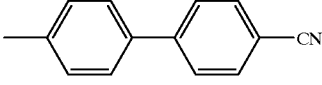

(Bu-11)

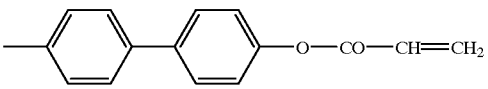

(Bu-12)

In the formula (I), L is an (m+n)-valent linking group.

In the formula (I), each of m and n is independently an integer of 1 to 12, preferably 1 to 8, more preferably 1 to 6, further preferably 1 to 4, furthermore preferably 1 to 3, and most preferably 1.

In the case that each of m and n is 1, L is preferably a divalent linking group selected from the group consisting of an alkylene group, —O—, —CO—, —NR—, —SO$_2$—, and a combination thereof. Here R is a hydrogen or an alkyl group. Preferably, L contains at least one polar group (group other than -alkylene group-).

The above alkylene group preferably comprises 1 to 40, more preferably 1 to 30, further preferably 1 to 20, furthermore preferably 1 to 15 and most preferably 1 to 12 carbon atoms.

The above alkyl group preferably comprises 1 to 40, more preferably 1 to 30, further preferably 1 to 20, furthermore preferably 1 to 15 and most preferably 1 to 12 carbon atoms.

In the case that m is 2 or more, plural hydrophobic groups (Hb) may be different from each other.

In the case that n is 2 or more, plural bulky groups (Bu) may be different from each other.

If m or n is not less than 2, the linking group (L) may have a chain structure or a cyclic structure. In the case that the linking group (L) has a chain structure, the plural hydrophobic groups (Hb) or bulky groups (Bu) may connect to the main chain of the linking group (L) as side chains. In the case that the linking group (L) has a cyclic structure, the plural hydrophobic groups (Hb) or bulky groups (Bu) may connect to the ring of the linking group (L) as substituent groups.

If each of m and n is independently an integer of 2 to 12, the linking group (L) preferably has a cyclic structure.

Examples of the linking group (L) are shown below. In each example of divalent linking groups (L-1 to L-11), the left side is adjacent to the hydrophobic group (Hb), and the right side is adjacent to the bulky group (Bu). In each example of polyvalent linking groups (L-12 to L-17), the hydrophobic group (Hb) and the bulky group (Bu) are shown.

(L-1) —SO$_2$—N(n-C$_3$H$_7$)—C$_2$H$_4$—O—CO—O—

(L-2) —SO$_2$—N(n-C$_3$H$_7$)—C$_2$H$_4$—O—CO—NH—

(L-3) —SO$_2$—N(n-C$_3$H$_7$)—C$_2$H$_4$—O—CO—O—CH$_2$—

(L-4) —SO$_2$—NH—C$_2$H$_4$—O—CO—NH—

(L-5) —SO$_2$—NH—C$_2$H$_4$—O—CO—O—

(L-6) —CO—NH—C$_2$H$_4$—O—CO—O—

(L-7) —CO—NH—

(L-8) —NH—C$_2$H$_4$—O—CO—O—

(L-9) —CO—NH—C$_2$H$_4$—O—CO—NH—

(L-10) —SO$_2$—N(n-C$_3$H$_7$)—C$_6$H$_{12}$—O—CO—NH—

(L-11) —C$_2$H$_4$—O—CO—O—

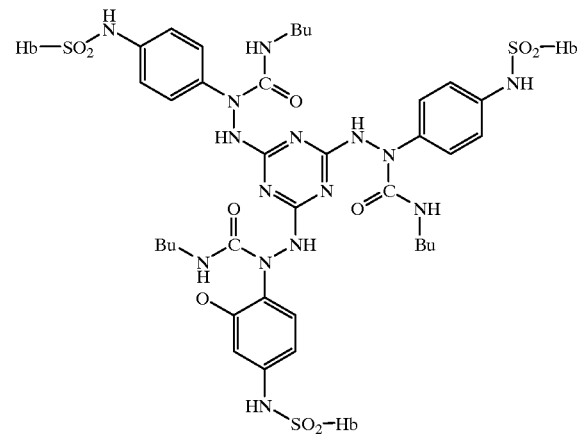

(L-13)

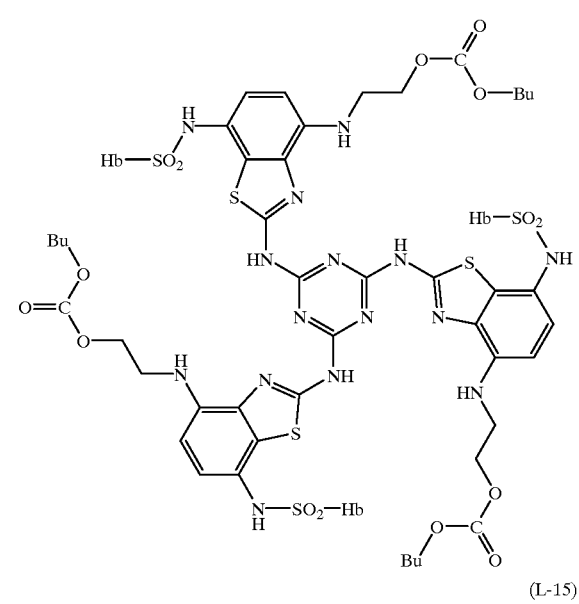

(L-14)

(L-15)

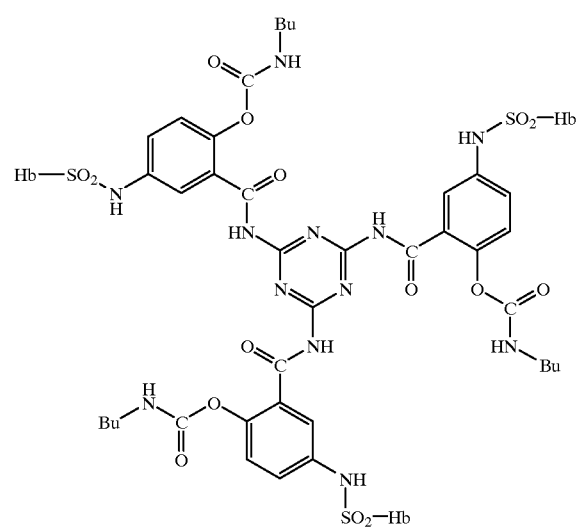

(L-12)

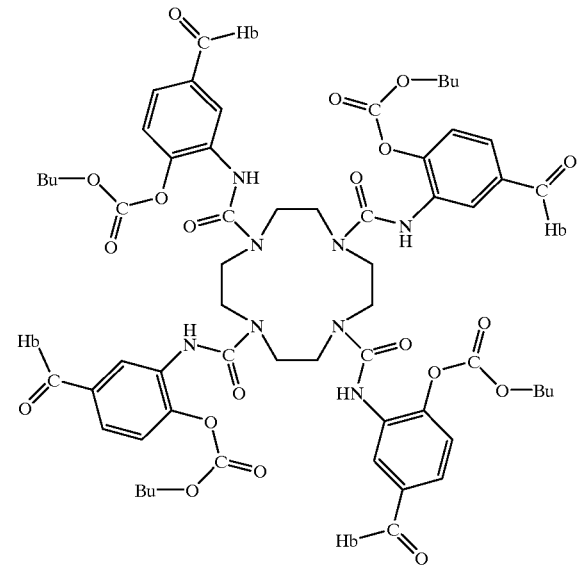

-continued

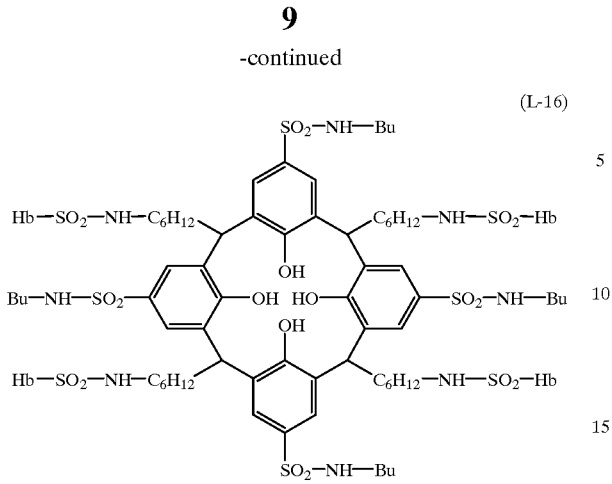

(L-16)

The alignment promoter is preferably represented by the formula (Ia):

Hb—L—Bu    (Ia)

In the formula (Ia), Hb is a fluorine-substituted alkyl group having 1 to 40 carbon atoms or a fluorine-substituted aryl group having 6 to 40 carbon atoms.

In the formula (Ia), Bu is a bulky group showing an excluded volume effect and comprising a tricyclic condensed ring, a tetracyclic condensed ring or at least two rings combined by a single bond, a vinylene bond or an ethynylene bond.

In the formula (Ia), L is a divalent linking group selected from the group consisting of an alkylene group, —O—, —CO—, —NR—, —SO$_2$— and a combination thereof. R is hydrogen or an alkyl group.

The alignment promoter is a compound consisting of the aforementioned hydrophobic group (Hb), the bulky group (Bu) showing an excluded volume effect and the linking group (L). There is no specific limitation on the combination thereof.

Examples of the alignment promoters are shown below. In the following examples, numbers added to Hb-, Bu- or L- indicate the examples shown above with those numbers.

I-1: (Hb-1)-(L-1)-(Bu-1)
I-2: (Hb-1)-(L-2)-(Bu-2)
I-3: (Hb-1)-(L-1)-(Bu-3)
I-4: (Hb-1)-(L-1)-(Bu-4)
I-5: (Hb-1)-(L-3)-(Bu-5)
I-6: (Hb-1)-(L-1)-(Bu-6)
I-7: (Hb-1)-(L-1)-(Bu-7)
I-8: (Hb-1)-(L-3)-(Bu-1)
I-9: (Hb-1)-(L-4)-(Bu-2)
I-10: (Hb-1)-(L-5)-(Bu-8)
I-11: (Hb-1)-(L-2)-(Bu-9)
I-12: (Hb-1)-(L-5)-(Bu-10)
I-13: (Hb-1)-(L-6)-(Bu-11)
I-14: (Hb-2)-(L-7)-(Bu-7)
I-15: (Hb-3)-(L-8)-(Bu-1)
I-16: (Hb-4)-(L-9)-(Bu-2)
I-17: (Hb-5)-(L-6)-(Bu-8)
I-18: (Hb-1)-(L-10)-(Bu-9)
I-19: (Hb-1)-(L-5)-(Bu-12)
I-20: (Hb-6)-(L-11)-(Bu-12)
I-21: (Hb-7)-(L-7)-(Bu-7)
I-22: (Hb-1)$_3$-(L-12)-(Bu-2)$_3$
I-23: (Hb-1)$_3$-(L-13)-(Bu-2)$_3$
I-24: (Hb-1)$_3$-(L-14)-(Bu-1)$_3$
I-25: (Hb-1)$_4$-(L-15)-(Bu-1)$_4$
I-26: (Hb-1)$_4$-(L-16)-(Bu-2)$_4$
I-27: (Hb-1)$_2$-(L-17)-(Bu-1)
I-28: (Hb-5)-(L-7)-(Bu-2)

SYNTHESIS EXAMPLE 1

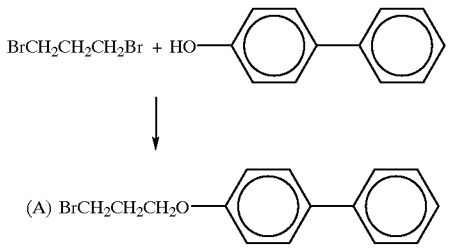

Synthesis of the Compound (A)

In a 1 litter three-necked flask equipped with a stirring device, 25.7 g (0.151 mol) of p-hydroxybiphenyl, 304.9 g (1.51 mol) of 1,3-dibromopropane, 46.2 g (0.332 mol) of potassium carbonate and 300 ml of N,N-dimethylformamide were placed and stirred at 130° C. for 5 hours. After cooling to room temperature, the mixture was extracted and washed with ethyl acetate/saturated NaCl aqueous solution. The ethyl acetate portion was collected, and dried over anhydrous sodium sulfate. After removing ethyl acetate under a reduced pressure, residual 1,3-dibromopropane was distilled off by means of a vacuum pump. The product was purified by column chromatography [stationary phase: silica-gel, developing solvent: hexane/methylene dichloride (1/1)], and recrystallized from methanol. [yield: 17.7 g (40%)].

$^1$H-NMR (solvent: CDCl$_3$): 2.3 ppm. multiplet, 2H; 3.7 ppm. doublet, 2H; 4.2 ppm. doublet, 2H; 7.0 ppm. doublet, 2H; 7.3 ppm. doublet, 1H; 7.4 ppm. triplet, 2H; 7.6 ppm. triplet, 4H

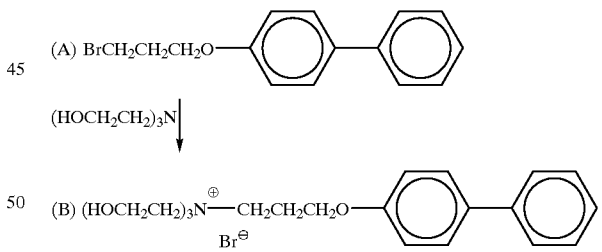

Synthesis of the Compound (B)

In a 100 ml three-necked flask equipped with a stirring device, 17.47 g (0.06 mol) of the compound (A) and 8.76 ml (0.066 mol) of triethanolamine were placed and stirred at 150° C. for 3 hours, to form a solid mixture. The mixture was dissolved in methanol, and filtered to remove insoluble substances. The solution was purified by column chromatography [stationary phase: silica-gel, developing solvent: hexane/methylene dichloride (5/1)]. Thus, 10.7 g of the compound (B) was prepared [yield: 41%].

$^1$H-NMR (solvent: DMSO-d$_6$): 2.2 ppm. multiplet, 2H; 3.6 ppm. multiplet, 8H; 3.8 ppm. triplet, 6H; 4.1 ppm. triplet, 2H; 7.0 ppm. doublet, 2H; 7.3 ppm. doublet, 1H; 7.4 ppm. triplet, 2H, 7.6 ppm. doublet, 4H

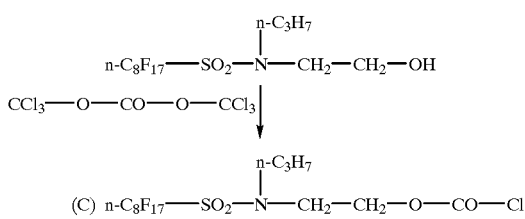

Synthesis of the Compound (C)

In a 1 litter three-necked flask equipped with a stirring device, 99.5 g (0.17 mol) of a fluorocarbon surface active agent [Megafuck F-104, Dainippon Ink & Chemicals, Inc.], 50.4 g (0.17 mol) of triphosgene and 390 ml of tetrahydrofuran were placed and stirred to prepare a solution. The solution was further stirred at room temperature for 3 hours, and then stored over night at room temperature. After tetrahydrofuran was removed under a reduced pressure, deposited excess triphosgene was filtered off to obtain 103.2 g of viscous oil. The viscous oil was purified by simple distillation. [3.2–3.4 mmHg/172–186° C., yield: 81.9 g (74%)]

$^1$H-NMR (solvent: CDCl$_3$): 1.0 ppm. triplet, 3H; 1.7 ppm. multiplet, 2H; 3.3–3.9 ppm. multiplet, 4H; 4.5 ppm. triplet, 2H N,N-dimethylformamide and 0.97 ml (0.012 mol) of pyridine were placed and stirred to prepare a solution. To the solution, 7.77 g (0.012 mol) of the compound (C) was dropwise added. The mixture was stirred at room temperature for 20 minutes, and further stirred at 70° C. for 3 hours. Since the compound (B) still remained in the mixture, 0.97 ml of pyridine and 7.77 g of the compound (C) were further added and stirred at 70° C. for 2 hours. The mixture was extracted and washed with ethyl acetate/saturated NaCl aqueous solution. The ethyl acetate portion was collected, and dried over anhydrous sodium sulfate. After removing ethyl acetate under a reduced pressure, the product was purified by column chromatography [stationary phase: silica-gel, developing solvent: methylene dichloride/methanol (5/1)]. [yield: 0.34 g (2%)].

$^1$H-NMR (solvent: CDCl$_3$): 0.9 ppm. triplet, 6H; 1.5–1.7 ppm. multiplet, 4H; 2.3–2.4 ppm. multiplet, 2H; 3.3–3.5 ppm. multiplet, 6H; 3.7–4.0 ppm. multiplet, 6H; 4.0–4.4 ppm. multiplet, 12H; 4.7 ppm. triplet, 4H; 7.0 ppm. doublet, 2H; 7.4 ppm. doublet, 1H; 7.5 ppm. triplet, 2H; 7.6 ppm. triplet, 4H

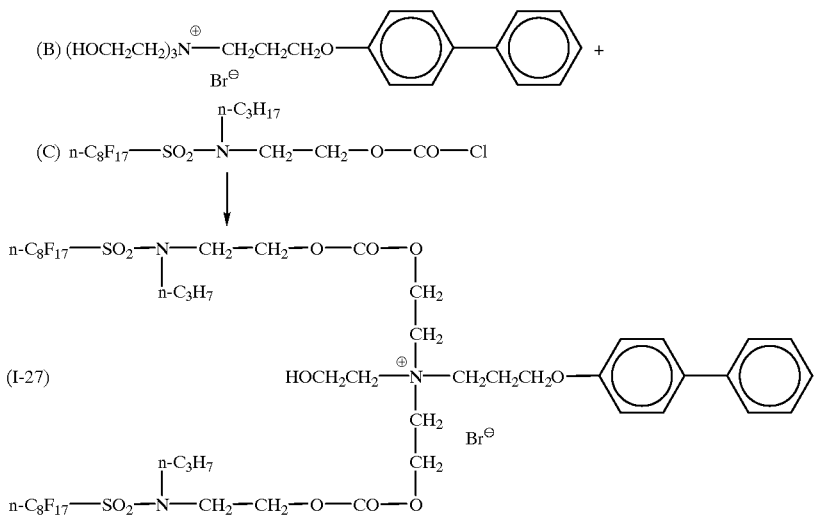

Synthesis of the Compound (I-27)

In a 100 ml three-necked flask equipped with a stirring device, 4.4 g (0.01 mol) of the compound (B), 30 ml of

SYNTHESIS EXAMPLE 2

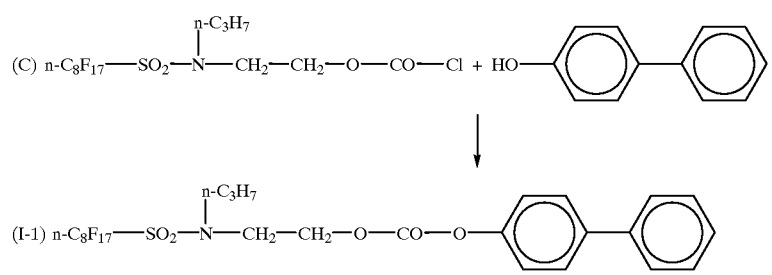

Synthesis of the Compound (I-1)

In a 100 ml three-necked flask equipped with a stirring device, 3.4 g (0.02 mol) of p-hydroxybiphenyl, 20 ml of tetrahydrofuran and 1.94 ml (0.024 mol) of pyridine were placed and stirred to prepare a solution. Independently, 15.55 g (0.024 mol) of the compound (C) prepared in Synthesis example 1 was dissolved in 10 ml of tetrahydrofuran to prepared another solution, and the thus-prepared solution was dropwise added to the above solution. The mixed solution was stirred at room temperature for 1 hour, and then extracted and washed with ethyl acetate/saturated NaCl aqueous solution. The ethyl acetate portion was collected, and dried over anhydrous sodium sulfate. After removing ethyl acetate under a reduced pressure, the product was purified by column chromatography [stationary phase: silica-gel, developing solvent: hexane/chloroform (2/1)]. [yield: 5.7 g (37%)].

$^1$H-NMR (solvent: CDCl$_3$): 1.0 ppm. triplet, 3H; 1.7–1.8 ppm. multiplet, 2H; 3.3–4.0 ppm. multiplet, 4H; 4.4 ppm. triplet, 2H; 7.2–7.6 ppm. multiplet, 9H

SYNTHESIS EXAMPLE 3

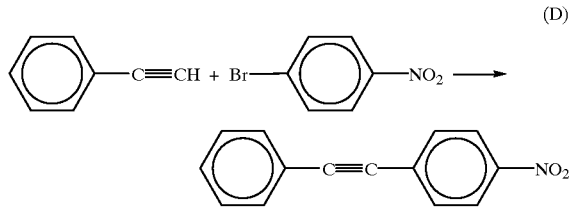

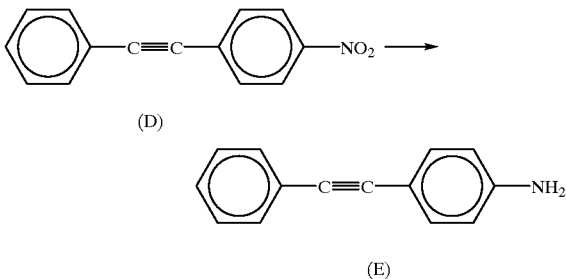

Synthesis of the Compound (D)

In a 300 ml three-necked flask equipped with a stirring device and a reflux condenser, 31.9 g (0.312 mol) of ethynylbenzene, 52.5 g (0.26 mol) of p-nitrobromobenzene, 0.55 g (0.78 mmol) of bis(triphenylenephosphine)palladium (II) dichloride, 1.09 g of triphenylphosphine, 0.18 g (0.94 mmol) of copper iodide and 150 ml of triethylamine were placed, heated and stirred at 100° C. for 2 hours under nitrogen gas atmosphere. After cooling to room temperature, the mixture was extracted and washed with ethyl acetate/saturated NaCl aqueous solution, and further washed with saturated NaCl aqueous solution. The ethyl acetate portion was collected, and dried over anhydrous sodium sulfate. After removing ethyl acetate under a reduced pressure, the product was recrystallized from 1.2 litter of methanol. [yield: 44.8 g (77%)].

Synthesis of the Compound (E)

In a 300 ml three-necked flask equipped with a stirring device and a reflux condenser, 13.9 g (0.25 mol) of reduced iron, 60 ml of isopropyl alcohol, 24 ml of water and 0.50 g (9.3 mmol) of ammonium chloride were placed. While the mixture was heated and stirred at 90° C., 13.9 g of the compound (D) was gradually added to the flask. The resulting mixture was further heated and stirred for 30 minutes, and 120 ml of tetrahydrofuran was added. While the elevated temperature was kept, the mixture was filtered through sellaite. The filtrate was concentrated by distilling off the solvent under a reduced pressure until the amount of the solvent reached 70 ml, to deposit a yellow precipitation. After the precipitation was removed by filtration, the filtrate was poured into 150 ml of water to precipitate a crystalline product. The product was recrystallized from 60 ml of methanol to obtain 8.2 g of the compound (E). [yield: 69%].

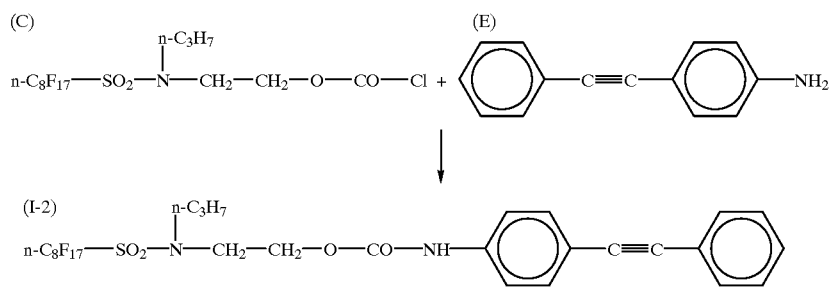

Synthesis of the Compound (I-2)

In a 100 ml three-necked flask equipped with a stirring device, 3.87 g (0.02 mol) of the compound (E), 30 ml of N,N-dimethylacetamide and 1.94 ml (0.024 mol) of pyridine were placed and stirred to prepare a solution. While the solution was stirred, 15.55 g (0.024 mol) of the compound (C) prepared in Synthesis example 1 was dropwise added. The mixture was stirred at room temperature for 10 minutes, and then poured into 200 ml of diluted hydrochloric acid to precipitate a crystalline product. The product was collected by filtration, and recrystallized from tetrahydrofuran/methanol to obtain 8.38 g of the compound (I-2). [yield: 52%].

$^1$H-NMR (solvent: CDCl$_3$): 1.0 ppm. triplet, 3H; 1.7 ppm. multiplet, 2H; 3.3–3.9 ppm. multiplet, 4H; 4.4 ppm. triplet, 2H; 6.7 ppm. singlet, 1H; 7.3–7.6 ppm. multiplet, 9H

Liquid Crystal Composition

The liquid crystal composition comprises liquid crystal molecules and the alignment promoter. Two or more liquid crystal compounds can be used in combination. Two or more kinds of the alignment promoter can be used in combination.

The amount of the alignment promoter is in the range of 0.01 to 20 wt. %, and preferably in the range of 0.1 to 5 wt. % based on that of the liquid crystal molecules.

Discotic or rod-like liquid crystal molecules are preferably used as the liquid crystal molecules. The molecules preferably have polymerizable groups.

The discotic liquid crystal molecule is described in various documents (C. Destrade et al, Mol. Crysr. Liq. Cryst., vol. 71, page 111 (1981); Japan Chemical Society, Quarterly Chemical Review (written in Japanese), chapter 5 and chapter 10, section 2 (1994); B. Kohne et al., Angew. Chem. Soc. Chem. Comm., page 1794 (1985); and J. Zhang et al., J. Am. Chem. Soc., vol. 116, page 2655 (1994)). The polymerization reaction of the discotic liquid crystal molecule is described in Japanese Patent Provisional Publication No. 8(1996)-27284.

For fixing the alignment, a polymerizable group should be bound to a discotic core of the discotic liquid crystal molecule to cause the polymerization reaction of the compound. However, if the polymerizable group is directly bound to the discotic core, it is difficult to keep the alignment at the polymerization reaction. Therefore, a linking group is introduced between the discotic core and the polymerizable group. Accordingly, the discotic liquid crystal molecule having a polymerizable group (polymerizable discotic liquid crystal molecule) is preferably represented by the following formula:

$$D(-L-Q)_n$$

in which D is a discotic core; L is a divalent linking group; Q is a polymerizable group; and n is an integer of 4 to 12.

Examples of the discotic cores (D) are shown below. In the examples, LQ (or QL) means the combination of the divalent linking group (L) and the polymerizable group (Q). Triphenylene (D4) is particularly preferred.

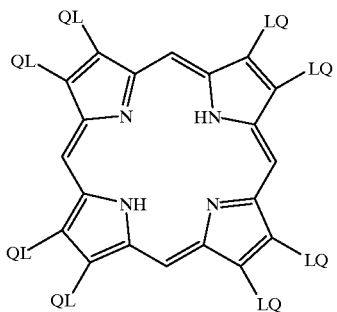

(D1)

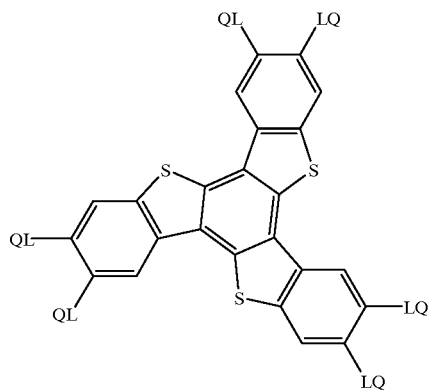

(D2)

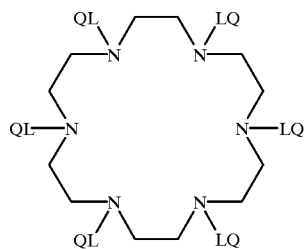

(D3)

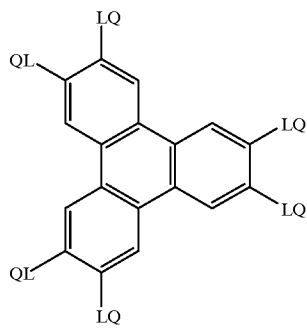

(D4)

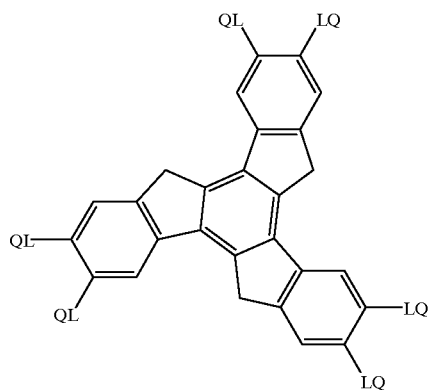

(D5)

(D6)
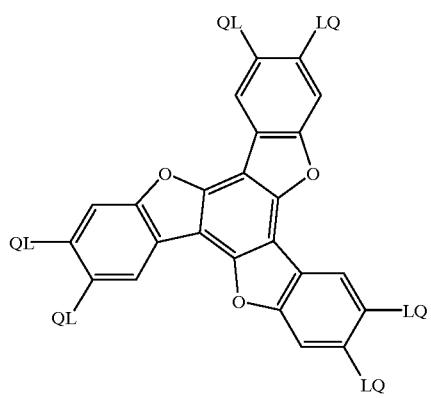
(D7)
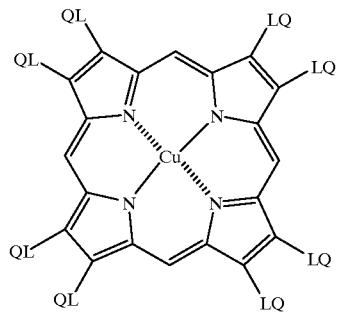
(D8)
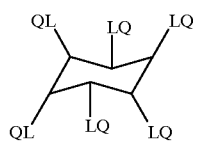
(D9)
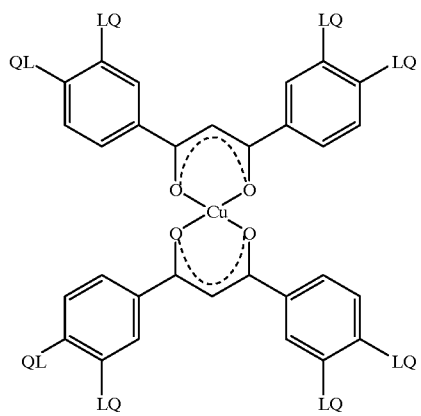
(D10)
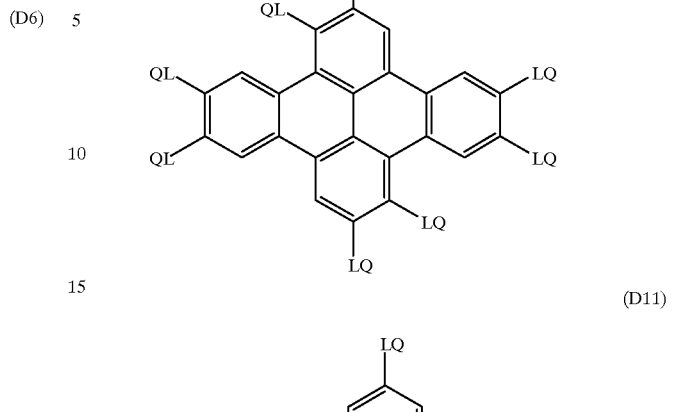
(D11)
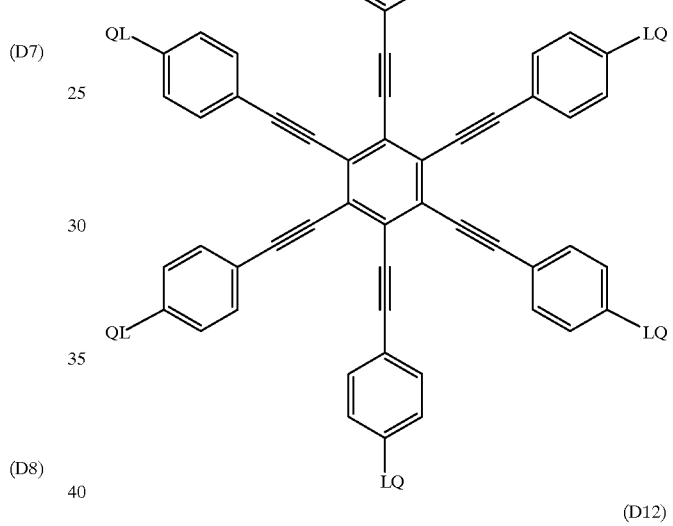
(D12)
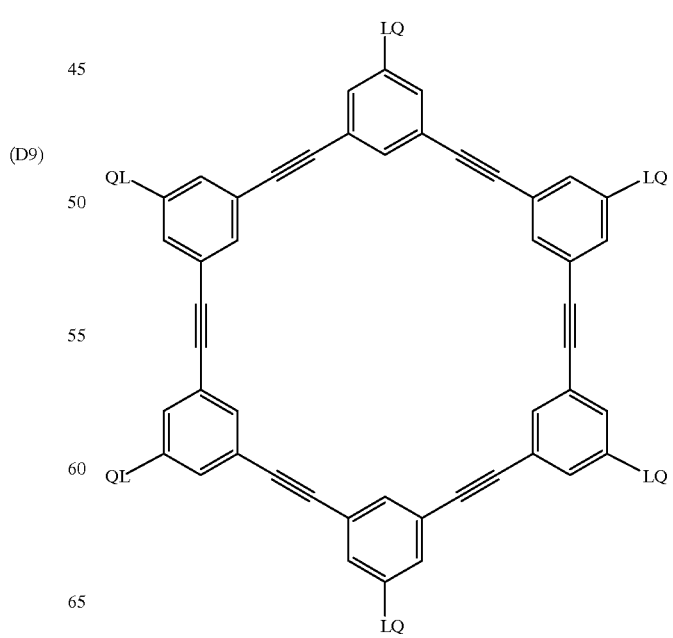

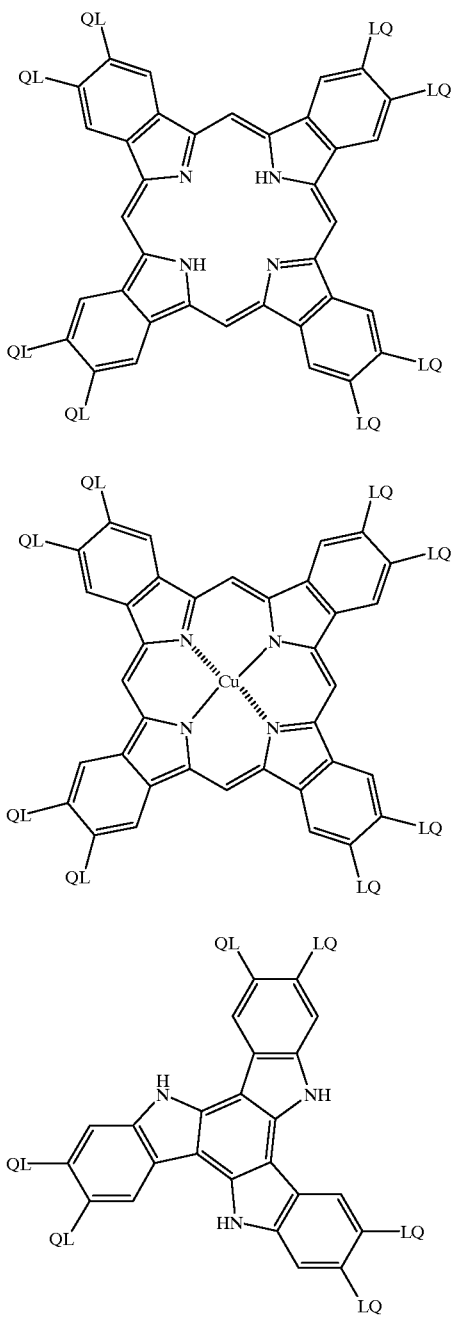

(D13)

(D14)

(D15)

In the formula, the divalent linking group (L) is preferably selected from the group consisting of an alkylene group, an alkenylene group, an arylene group, —CO, —NH—, —O—, —S— and a combination thereof. L more preferably is a divalent linking group comprising at least two divalent groups selected from the group consisting of an alkylene group, an alkenylene group, an arylene group, —CO—, —NH—, —O— and —S—. L further preferably is a divalent linking group comprising at least two divalent groups selected from the group consisting of an alkylene group, an alkenylene group, an arylene group, —CO— and —O—. The alkylene group preferably has 1 to 12 carbon atoms. The alkenylene group preferably has 2 to 12 carbon atoms. The arylene group preferably has 6 to 10 carbon atoms. The alkylene group, the alkenylene group and the arylene group can have a substituent group (such as an alkyl group, a halogen atom, cyano, an alkoxy group, an acyloxy group).

Examples of the divalent linking groups (L) are shown below. In the examples, the left side is attached to the discotic core (D), and the right side is attached to the polymerizable group (Q). The AL means an alkylene group or an alkenylene group. The AR means an arylene group.

L1: —AL—CO—O—AL—
L2: —AL—CO—O—AL—O—
L3: —AL—CO—O—AL—O—AL—
L4: —AL—CO—O—AL—O—CO—
L5: —CO—AR—O—AL—
L6: —CO—AR—O—AL—O—
L7: —CO—AR—O—AL—O—CO—
L8: —CO—NH—AL—
L9: —NH—AL—O—
L10: —NH—AL—O—CO—
L11: —O—AL—
L12: —O—AL—O—
L13: —O—AL—O—CO—
L14: —O—AL—O—CO—NH—AL—
L15: —O—AL—S—AL—
L16: —O—CO—AL—AR—O—AL—O—CO—
L17: —O—CO—AR—O—AL—CO—
L18: —O—CO—AR—O—AL—O—CO—
L19: —O—CO—AR—O—AL—O—AL—O—CO—
L20: —O—CO—AR—O—AL—O—AL—O—AL—O—CO—
L21: —S—AL—
L22: —S—AL—O—
L23: —S—AL—O—CO—
L24: —S—AL—S—AL—
L25: —S—AR—AL—

The discotic liquid crystal molecules can be oriented in spirally twisted alignment by introducing an asymmetric carbon atom into AL (an alkylene group or an alkenylene group). Examples of AL containing asymmetric carbon atoms (AL*) are shown below. In the examples, the left side is adjacent to the discotic core (D)., and the right side is adjacent to the polymerizable group (Q). The carbon atom (C) with the mark (*) is the asymmetric carbon atom. The optical activity can be either S or R.

AL*1: —CH$_2$CH$_2$—C*HCH$_3$—CH$_2$CH$_2$CH$_2$—
AL*2: —CH$_2$CH$_2$CH$_2$—C*HCH$_3$—CH$_2$CH$_2$—
AL*3: —CH$_2$—C*HCH$_3$—CH$_2$CH$_2$CH$_2$CH$_2$—
AL*4: —C*HCH$_3$—CH$_2$CH$_2$CH$_2$CH$_2$CH$_2$—
AL*5: —CH$_2$CH$_2$CH$_2$CH$_2$—C*HCH$_3$—CH$_2$—
AL*6: —CH$_2$CH$_2$CH$_2$CH$_2$CH$_2$—C*HCH$_3$—
AL*7: —C*HCH$_3$—CH$_2$CH$_2$CH$_2$CH$_2$—
AL*8: —CH$_2$—C*HCH$_3$—CH$_2$CH$_2$CH$_2$—
AL*9: —CH$_2$CH$_2$—C*HCH$_3$—CH$_2$CH$_2$—
AL*10: —CH$_2$CH$_2$CH$_2$—C*HCH$_3$—CH$_2$—
AL*11: —CH$_2$CH$_2$CH$_2$CH$_2$—C*HCH$_3$—
AL*12: —C*HCH$_3$—CH$_2$CH$_2$CH$_2$—
AL*13: —CH$_2$—C*HCH$_3$—CH$_2$CH$_2$—
AL*14: —CH$_2$CH$_2$—C*HCH$_3$—CH$_2$—
AL*15: —CH$_2$CH$_2$CH$_2$—C*HCH$_3$—
AL*16: —CH$_2$—C*HCH$_3$—

AL*17: —C*HCH₃—CH₂—
AL*18: —C*HCH₃—CH₂CH₂CH₂CH₂CH₂—
AL*19: —CH₂—C*HCH₃—CH₂CH₂CH₂CH₂CH₂—
AL*20: —CH₂CH₂—C*HCH₃—CH₂CH₂CH₂CH₂—
AL*21: —CH₂CH₂CH₂—C*HCH₃—CH₂CH₂CH₂—
AL*22: —C*HCH₃—CH₂CH₂CH₂CH₂CH₂CH₂CH₂—
AL*23: —CH₂—C*HCH₃—CH₂CH₂CH₂CH₂CH₂CH₂—
AL*24: —CH₂CH₂—C*HCH₃—CH₂CH₂CH₂CH₂CH₂—
AL*25: —CH₂CH₂CH₂—C*HCH₃—CH₂CH₂CH₂CH₂—
AL*26: —C*HCH₃—CH₂CH₂CH₂CH₂CH₂CH₂CH₂CH₂—
AL*27: —CH₂—C*HCH₃—CH₂CH₂CH₂CH₂CH₂CH₂CH₂—
AL*28: —CH₂—C*HCH₂CH₃—
AL*29: —CH₂—C*HCH₂CH₃—CH₂—
AL*30: —CH₂—C*HCH₂CH₃—CH₂CH₂—
AL*31: —CH₂—C*HCH₂CH₃—CH₂CH₂CH₂—
AL*32: —CH₂—C*H(n—C₃H₇)—CH₂CH₂—
AL*33: —CH₂—C*H(n—C₃H₇)—CH₂CH₂CH₂CH₂—
AL*34: —CH₂—C*H(OCOCH₃)—CH₂CH₂—
AL*35: —CH₂—C*H(OCOCH₃)—CH₂CH₂CH₂CH₂—
AL*36: —CH₂—C*HF—CH₂CH₂—
AL*37: —CH₂—C*HF—CH₂CH₂CH₂CH₂—
AL*38: —CH₂—C*HCl—CH₂CH₂—
AL*39: —CH₂—C*HCl—CH₂CH₂CH₂CH₂—
AL*40: —CH₂—C*HOCH₃—CH₂CH₂—
AL*41: —CH₂—C*HOCH₃—CH₂CH₂CH₂CH₂
AL*42: —CH₂—C*HCN—CH₂CH₂—
AL*43: —CH₂—C*HCN—CH₂CH₂CH₂CH₂—
AL*44: —CH₂—C*HCF₃—CH₂CH₂—
AL*45: —CH₂—C*HCF₃—CH₂CH₂CH₂CH₂—

The polymerizable group (Q) is determined according to the polymerization reaction. Examples of the polymerizable groups (Q) are shown below.

 (Q1)

—CH═CH₂

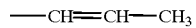 (Q2)

—CH═CH—CH₃

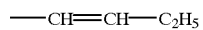 (Q3)

—CH═CH—C₂H₅

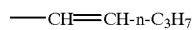 (Q4)

—CH═CH-n-C₃H₇

(Q5)
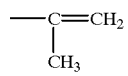

(Q6)
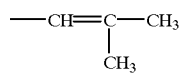

(Q7)

—C≡CH (Q8)
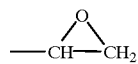

-continued (Q9)
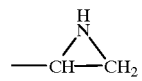

(Q10)
—SH (Q11)
—CHO (Q12)
—OH (Q13)
—CO₂H (Q14)
—N═C═O (Q15)
—NH₂

(Q16)
—SO₃H (Q17)
—N═C═S

The polymerizable group (Q) preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6).

In the formula, n is an integer of 4 to 12, which is determined according to the chemical structure of the discotic core (D). The 4 to 12 combinations of L and Q can be different from each other. However, the combinations are preferably identical.

Two or more kinds of the discotic liquid crystal molecules can be used in combination. For example, the molecules containing an asymmetric carbon atom in the divalent linking group (L) can be used in combination with those containing no asymmetric carbon atom. Further, the molecules having a polymerizable group (Q) can be used in combination with those having no polymerizable group (i.e., the molecules having a hydrogen atom in place of the polymerizable group (Q)). The liquid crystal molecules containing an asymmetric carbon atom and having no polymerizable group are particularly preferably used in combination with those having a polymerizable group and containing no asymmetric carbon atom. Practically, the former molecules function as a chiral agent rather than the discotic liquid crystal.

In place of introducing an asymmetric carbon atom into the divalent linking group of the discotic liquid crystal molecule, the molecules can also be oriented in spirally twisted alignment by adding an optical active compound containing an asymmetric carbon atom (i.e., chiral agent) into the optically anisotropic layer. Various natural or synthetic optical active compounds can be used as the chiral agent. The chiral agent can have a polymerizable group, which is the same as or similar to the polymerizable group of the discotic liquid crystal compound. The discotic liquid crystal molecules are fixed in the optically anisotropic layer by a polymerization reaction after the molecules are essentially vertically (homogeneously) aligned. The chiral agent having a polymerizable group can also be fixed by the same or a similar polymerization reaction.

Preferred examples of the rod-like liquid crystal molecules include azomethines, azoxy compounds, cyanobiphenyls, cyanophenyl esters, benzoic esters, cyclo hexanecarbonic phenyl esters, cyanophenylcyclohexanes, cyano-substituted phenylpyrimidines, alkoxy-substituted phenylpyrimidines, phnyldioxanes, tolans and alkenylcyclohexylbenzonitrile.

A liquid crystal cell of a VA (vertical alignment) mode is a typical example of the cell in which rod-like liquid crystal molecules are essentially vertically aligned. A liquid crystal display comprising the liquid crystal cell of a VA (vertical aligned) mode is described in "Nikkei Microdevice (written in Japanese)" 136(1996), pp.147; Japanese Patent Provisional Publication No. 2(1990)-176625, and Japanese Patent No. 2,866,372.

The rod-like liquid crystal molecules preferably have a refractive index of birefringence in the range of 0.001 to 0.7. Also the rod-like liquid crystal molecules preferably have polymerizable groups. Examples of the polymerizable groups are the same as those (Q) for the discotic liquid crystal molecules.

The rod-like liquid crystal molecule preferably has a molecular structure nearly symmetric with respect to the minor axis. Accordingly, the molecule preferably has polymerizable groups at both ends.

Examples of the rod-like liquid crystal molecules are shown below.

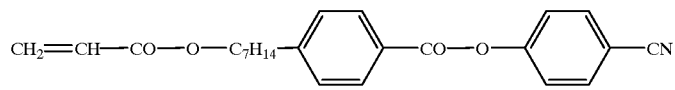
(N1)

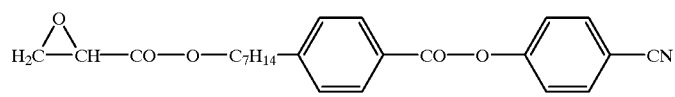
(N2)

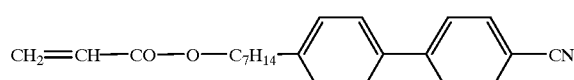
(N3)

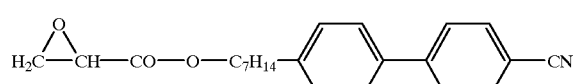
(N4)

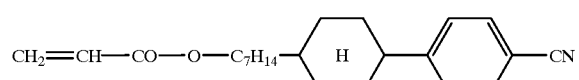
(N5)

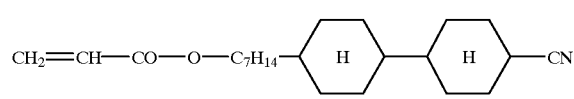
(N6)

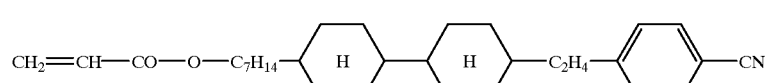
(N7)

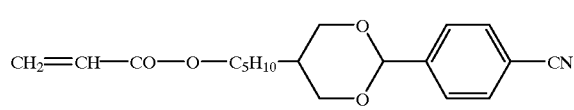
(N8)

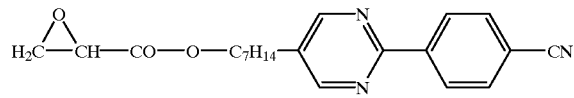
(N9)

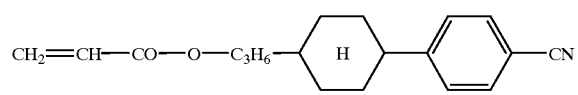
(N10)

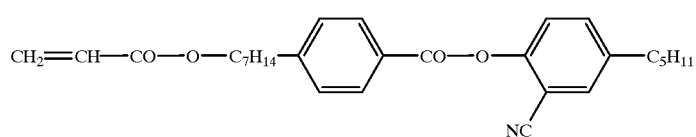
(N11)

-continued
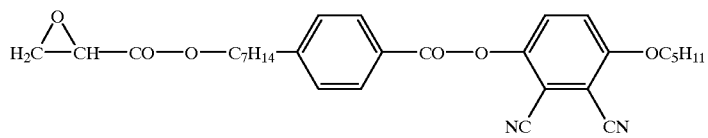 (N12)
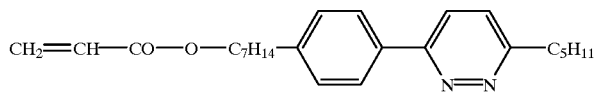 (N13)
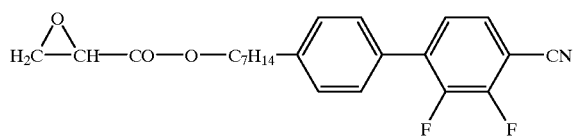 (N14)
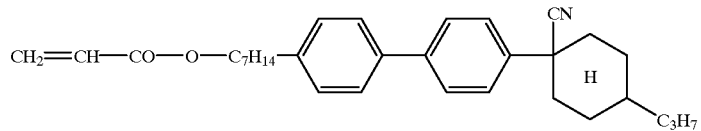 (N15)
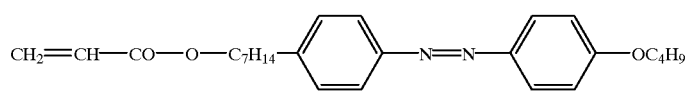 (N16)
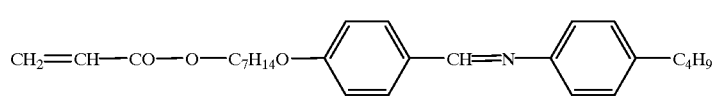 (N17)
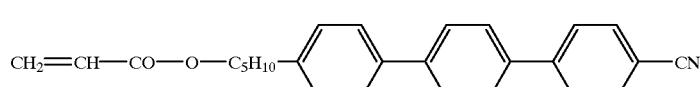 (N18)
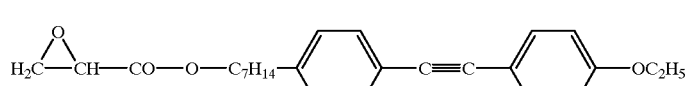 (N19)
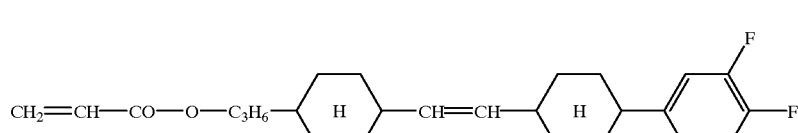 (N20)
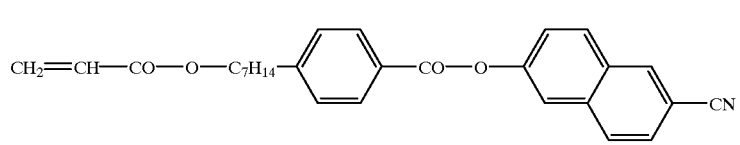 (N21)
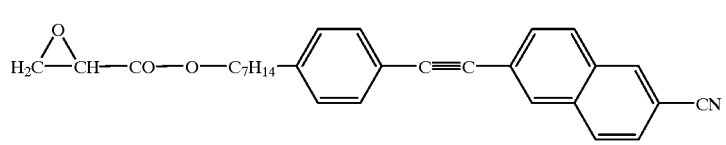 (N22)
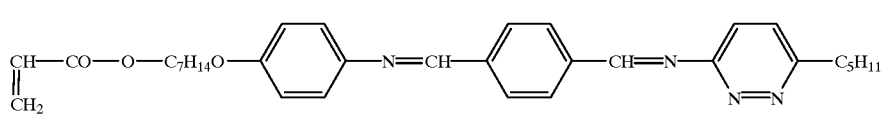 (N23)

(N24)
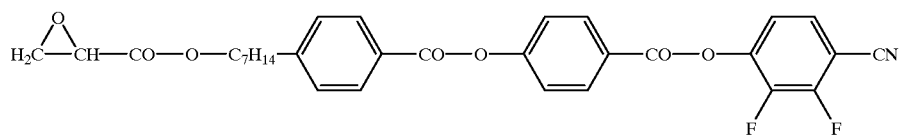
(N25)
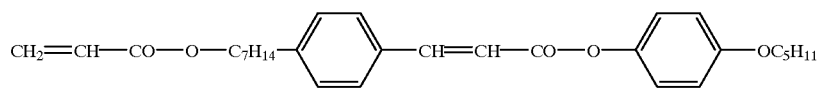
(N26)
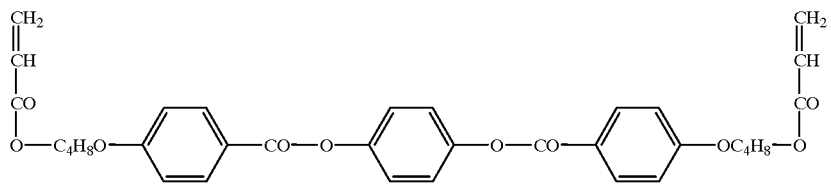
(N27)
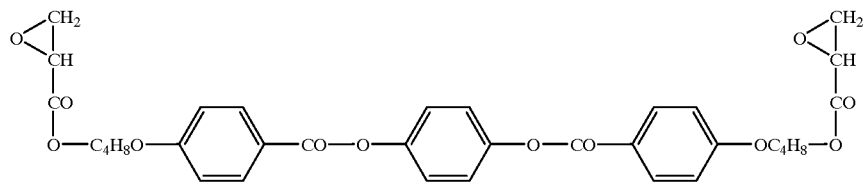
(N28)
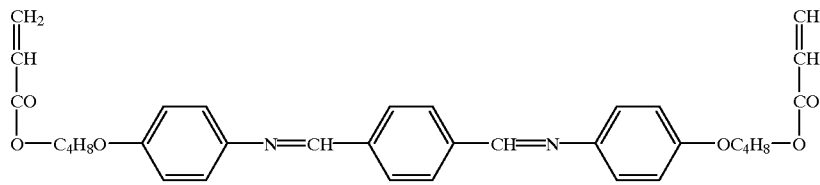
(N29)
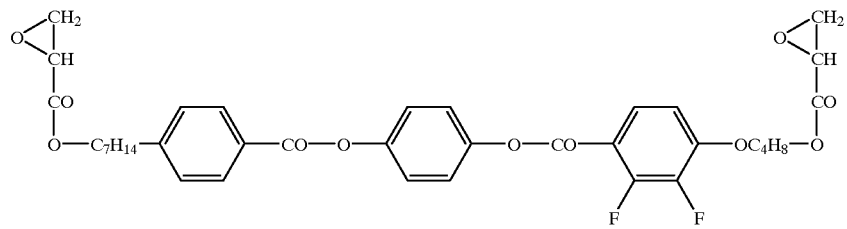
(N30)
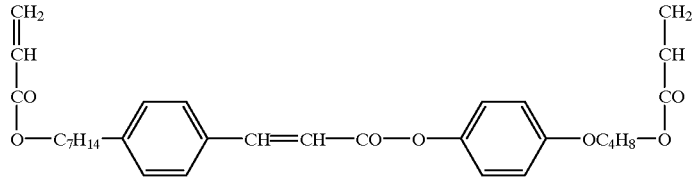
(N31)
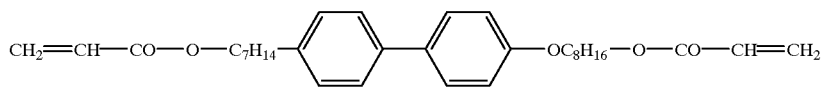
(N32)
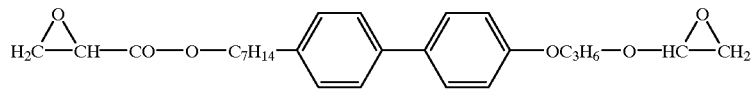

-continued
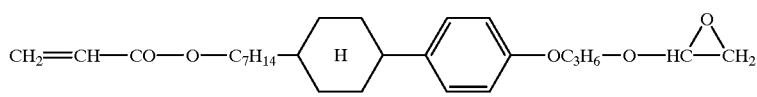
(N33)
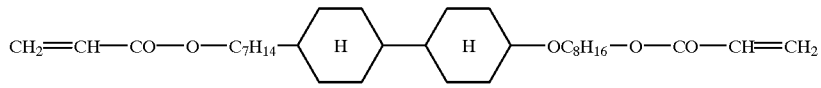
(N34)
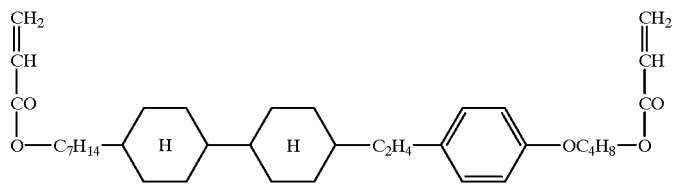
(N35)
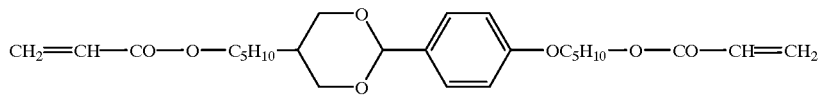
(N36)
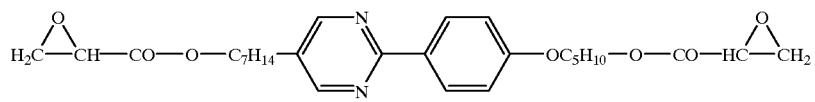
(N37)
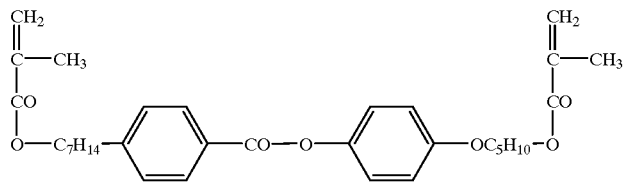
(N38)
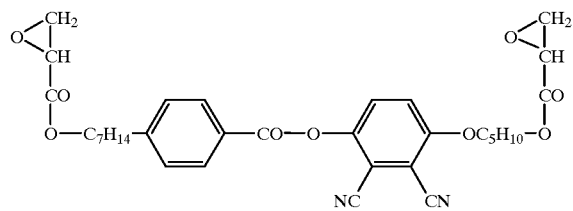
(N39)
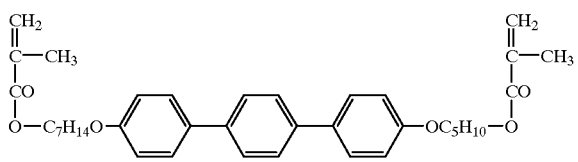
(N40)
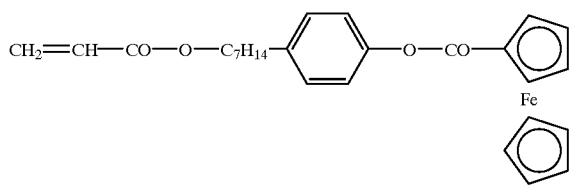
(N41)

-continued
(N42)
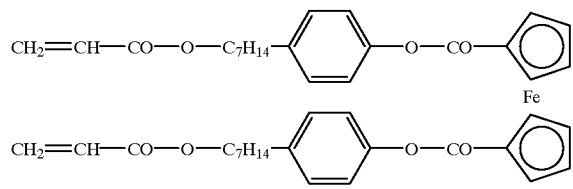
(N43)
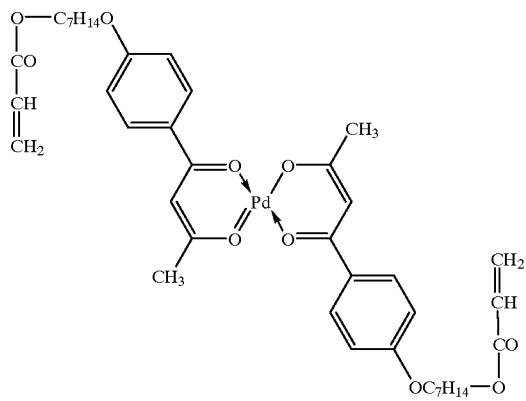
(N44)
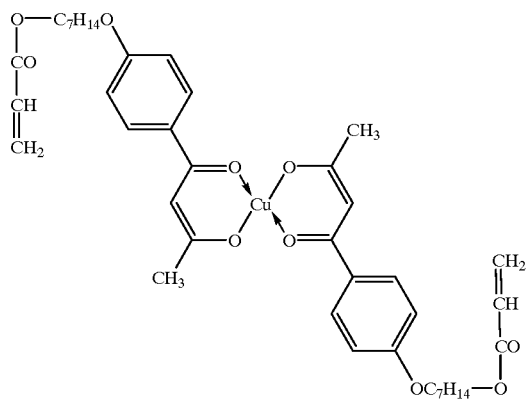
(N45)
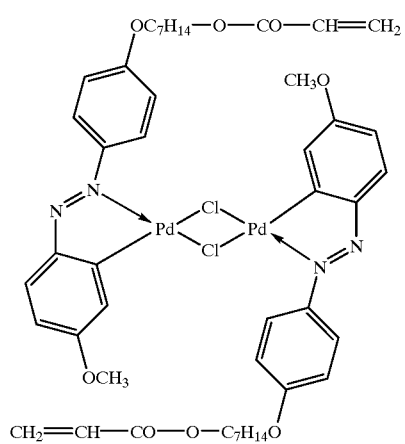

-continued

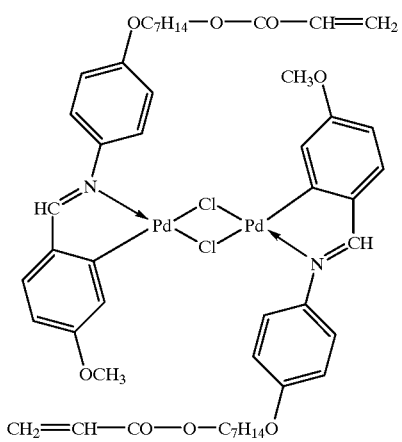

(N46)

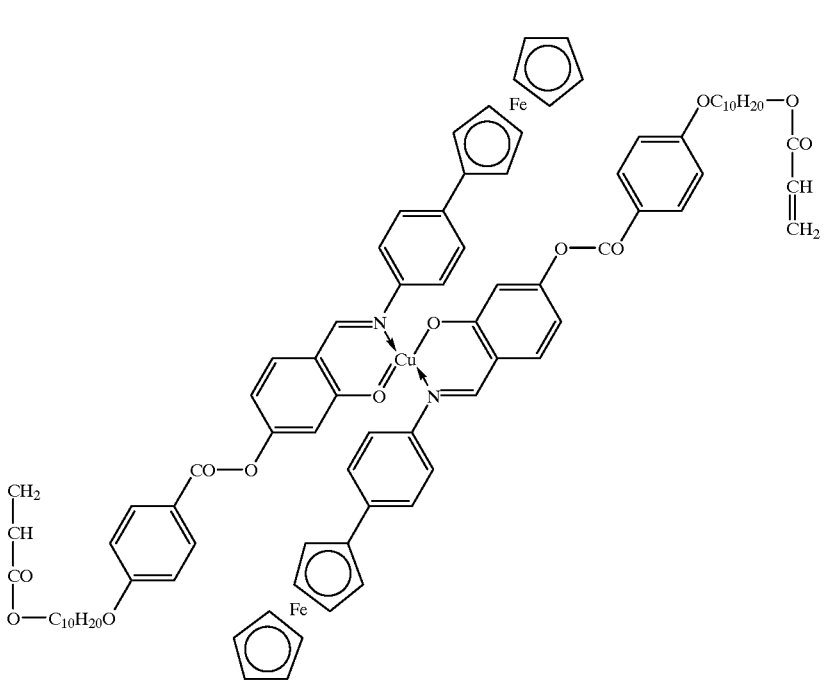

(N47)

In addition to the liquid crystal molecules and the alignment promoter, the liquid crystal composition can contain, if needed, a solvent, a compound having an asymmetric carbon, a polymerization initiator (described below) and other additives (e.g., cellulose esters).

As the solvent, organic solvents are preferred. Examples of the organic solvents include amides (e.g., dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents can be used in combination.

Optically Anisotropic Element

The optically anisotropic element can be produced by applying the liquid crystal composition onto an orientation layer to form a liquid crystal layer. The composition can be coated according to a conventional coating method such as an extrusion coating method, a direct gravure coating method, a reverse gravure coating method, a die coating method or a bar coating method.

The liquid crystal molecules are preferably fixed while the alignment is maintained. The liquid crystal molecules are fixed preferably by a polymerization reaction of the polymerizable groups (Q). The polymerization reaction can be classified into a thermal reaction using a thermal polymerization initiator and a photo reaction using a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution.

The light irradiation for the photo polymerization is preferably conducted with an ultraviolet ray.

The exposure energy is preferably in the range of 20 to 50,000 mJ per cm$^2$, and more preferably in the range of 100 to 800 mJ per cm$^2$. The light irradiation can be conducted while the layer is heated to accelerate the photo polymerization reaction.

The liquid crystal layer has a thickness preferably in the range of 0.1 to 50 μm, more preferably 1 to 30 μm, and most preferably in the range of 5 to 20 μm.

The amount of the alignment promoter in the liquid crystal layer is preferably in the range of 0.005 to 0.5 g/m$^2$, more preferably 0.01 to 0.45 g/m$^2$, further preferably 0.02 to 0.40 g/m$^2$, and most preferably 0.03 to 0.35 g/m$^2$.

Orientation Layer

The orientation layer can be formed by rubbing treatment of an organic compound (preferably a polymer), oblique evaporation of an inorganic compound, formation of a micro groove layer, or stimulation of an organic compound (e.g., ω-tricosanoic acid, dioctadecylmethylammonium chloride, methyl stearate) according to a Langmuir-Blodgett method. Further, the aligning function of the orientation layer can be activated by applying an electric or magnetic field to the layer or irradiating the layer with light. The orientation layer is preferably formed by rubbing a polymer. The rubbing treatment can be conducted by rubbing a layer containing the aforementioned polymer with paper or cloth several times along a certain direction.

The polymer for the orientation layer is determined according to the aimed alignment (particularly the aimed average inclined angle) of the liquid crystal molecules.

For aligning the liquid crystal molecules horizontally (in an average inclined angle of 0 to 50°), a polymer which does not lower the surface energy of the orientation layer (namely, a polymer usually used for the orientation layer) is preferred.

For aligning the liquid crystal molecules vertically (in an average inclined angle of 50 to 90°), a polymer which lowers the surface energy of the orientation layer is preferred. In order to lower the surface energy, a hydrocarbon group having 10 to 100 carbon atoms is preferably introduced to the side chain of the polymer.

Documents describing optical compensation sheets comprising the liquid crystal molecules for various display modes are known, and concrete examples of the polymer for each display mode are disclosed in these documents.

The orientation layer preferably has a thickness of 0.01 to 5 μm, more preferably 0.05 to 1 μm.

After the liquid crystal molecules are aligned by the orientation layer and fixed with the alignment maintained to form an optically anisotropic layer, the optically anisotropic layer can be transferred to a support. The aligned and fixed discotic liquid crystal molecules can keep the alignment without the orientation layer.

Alignment in an average inclined angle of less than 5° C. can be obtained without rubbing treatment nor the orientation layer. However, even in that case, an orientation layer which chemically combines with the liquid crystal molecules on the interface can be provided, so as to improve adhesion between the molecules and the support (Japanese Patent Provisional Publication No. 9(1997)-152509). Such orientation layer does not need the rubbing treatment.

In the case that two liquid crystal layers are provided on the same side of the transparent support, the layer beforehand provided on the support can function as the orientation layer for the other layer provided thereon.

Transparent Support

The optically anisotropic element may have a transparent support, which is a glass plate or a polymer film. The support is preferably made of a polymer film. Here the term "transparent" means that light transmittance is not less than 80%.

Usually, an optically isotropic polymer film is used as the support. The term "optically isotropic" means that a retardation in plane (Re) of the film is preferably less than 10 nm, and more preferably less than 5 nm. In the optically isotropic transparent support, retardation along a thickness direction (Rth) is also preferably less than 10 nm, more preferably less than 5 nm. The Re and Rth retardation values are defined by the following formulas:

Re=(nx−ny)×d

Rth=[{(nx+ny)/2}−nz]×d in which each of nx and ny is a refractive index in plane; nz is a refractive index along a thickness direction; and d is a thickness of a transparent support.

In some cases, an optically anisotropic polymer film is used as the support. If so, the support is preferably an optically uniaxial or biaxial. The uniaxial support may be either optically positive (i.e., the refractive index parallel to the optical axis is larger than that vertical to the axis) or optically negative (i.e., the refractive index parallel to the optical axis is smaller than that vertical to the axis). If the support is optically biaxial, the indexes nx, ny and nz are different from each other (i.e., nx≠ny≠nz).

The Re (retardation in plane) of the optically anisotropic support is preferably in the range of 10 to 1,000 nm, more preferably 15 to 300 nm, most preferably 20 to 200 nm. The Rth (retardation along a thickness direction) is preferably in the range of 10 to 1,000 nm, more preferably to 300 nm, most preferably 20 to 200 nm.

Material for the support is determined according to whether the support is optically isotropic or not. The optically isotropic support is generally made of glass or cellulose ester, and in contrast the optically anisotropic support generally made of synthetic polymers (e.g., polycarbonate, polysulfone, polyethersulfone, polyacrylate, polymethacrylate and norbornene resin). Further, an optically anisotropic cellulose ester film (having high retardation values) can be also used. The optically anisotropic cellulose ester film can be prepared by (1) using a retardation increasing agent, (2) lowering the content of acetic acid in cellulose acetate or (3) using the cooling dissolution method (described in European Patent No. 0,911,656 A2).

The support of polymer film is preferably formed by a solvent casting method.

For preparing the optically anisotropic support, a polymer film is preferably stretched.

The optically uniaxial support is preferably produced by usual uniaxial or biaxial stretching.

On the other hand, the optically biaxial support is preferably produced by unbalance biaxial stretching. The procedure of unbalance biaxial stretching comprises the steps of stretching a film along one direction to expand by a certain extent (e.g., 3 to 100%, preferably 5 to 30%) and then stretching the film vertically to the direction of the first stretching to expand by a more extent than that in the first stretching (e.g., 6 to 200%, preferably 10 to 90%). In the procedure, the film may be stretched along the two vertical directions at the same time.

The direction of stretching (direction of high extension in the case of unbalance biaxial stretching) is preferably essentially parallel to the slow axis in plane of the stretched film. Here "essentially parallel" means that the angle between the stretching direction and the slow axis is preferably in the range of less than 10°, more preferably less than 5°, most preferably less than 3°.

The transparent support has a thickness preferably in the range of 10 to 500 μm, and more preferably in the range of 50 to 200 μm.

The transparent support can be subjected to a surface treatment (e.g., glow discharge treatment, corona discharge treatment, ultraviolet (UV) treatment, flame treatment) to improve adhesion to a layer formed on the support (e.g., adhesive layer, orientation layer, optically anisotropic layer). The support may contain UV absorber.

An adhesive layer (undercoating layer) can be provided on the transparent support. Japanese Patent Provisional Publication No. 7(1995)-333433 describes the adhesive layer. The adhesive layer has a thickness preferably in the range of 0.1 to 2 μm, more preferably 0.2 to 1 μm.

Liquid Crystal Display

The optically anisotropic element can be used as an optical compensatory sheet for liquid crystal displays of various modes. Examples of the display modes include TN (twisted nematic) mode, IPS (in plane switching) mode, FLC (ferroelectric liquid crystal) mode, OCB (optically compensatory bend) mode, STN (super twisted nematic) mode, VA (vertically aligned) mode, ECB (electrically controlled birefringence) mode and HAN (hybrid aligned nematic) mode. Optical compensatory sheets for these modes are known, and the optically anisotropic element of the invention can be applied for these optical compensatory sheets.

EXAMPLE 1

(Production of optically anisotropic element)

A triacetyl cellulose film (thickness: 100 μm, size: 270 mm×100 mm, FUJI TAC, Fuji Photo Film Co., Ltd.) was used as a transparent support.

The polyimide shown below was dissolved in a mixed solvent of N-methyl-2-pyrrolidone and 2-butanone in the amount of 5 wt. %. The prepared solution was applied on the transparent support by means of a bar coater. After the applied solution was dried with blowing air at 80° C. for 10 minutes, the surface of the formed layer was subjected to a rubbing treatment to form an orientation layer.

(Repeating unit of polyimide)

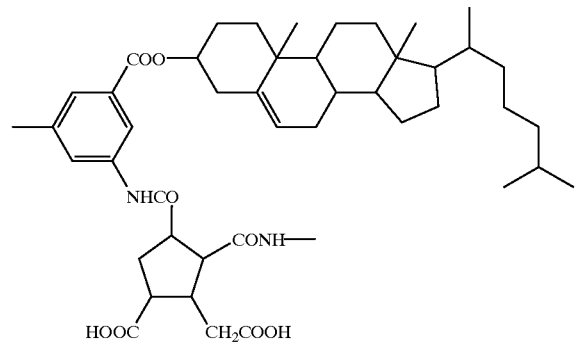

The orientation layer was coated with the coating solution having the following components according to the extrusion coating method. By heating the applied solution at 130° C., discotic liquid crystal molecules were aligned.

| Coating solution | |
|---|---|
| The following discotic liquid crystal compound: | 100 weight parts |
| The alignment promoter (I-1) prepared in Synthesis example 2 | 5.0 weight parts |
| A photopolymerization initiator (Irgacure 907, Ciba-Geigy) | 0.2 weight part |
| 2-butane | 185 weight parts |

(Discotic liquid crystal compound)

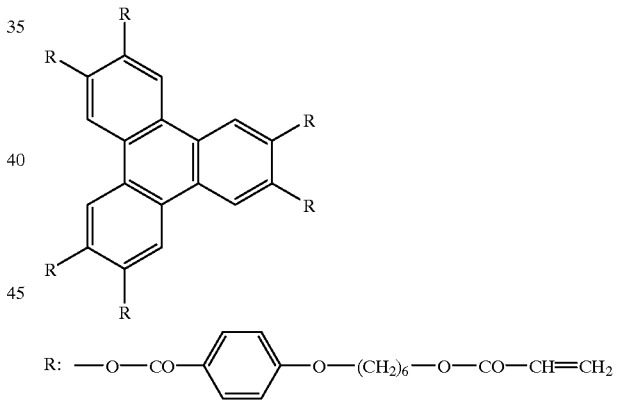

The formed layer was exposed to ultraviolet light for 4 seconds while heated at 130° C., to polymerize the terminal vinyl group of the discotic liquid crystal molecules and to fix the alignment. Thus an optically anisotropic element was produced.

The retardation in plane (Re) of the element was measured to obtain the angel dependency of Re, from which the average inclined angle of the discotic liquid crystal molecules was determined 88°. Further, the alignment of the discotic liquid crystal molecules was observed by means of a polarizing microscope, and thereby it was confirmed that all the molecules were uniformly oriented in monodomain alignment without any defect.

This measurement was further repeated twice. As the result, though there was a slight variation in the average inclined angle (second measurement: 89°, third measurement: 88°), no defect in the alignment was observed in either measurement.

COMPARISON EXAMPLE 1

The procedure of Example 1 was repeated except that the alignment promoter (I-1) was not used, to produce an optically anisotropic element.

The retardation in plane (Re) of the element was measured to obtain the angel dependency of Re, from which the average inclined angle of the discotic liquid crystal molecules was determined 75°. Further, the alignment of the discotic liquid crystal molecules was observed by means of a polarizing microscope, and thereby many island-like aligning defects were confirmed.

This measurement was further repeated twice. As the result, there was a considerable variation in the average inclined angle (second measurement: 72°, third measurement: 80°) and many island-like aligning defects were observed in either measurement.

APPLIED EXAMPLE 1
(Production of optical compensatory sheet)

A triacetyl cellulose film (thickness: 100 µm, size: 270 mm×100 mm, Fuji Tac, Fuji Photo Film Co., Ltd.) was used as a transparent support.

The polyimide used in Example 1 was dissolved in a mixed solvent of N-methyl-2-pyrrolidone and 2-butanone in the amount of 5 wt. %. The prepared solution was applied on the transparent support by means of a bar coater. After the applied solution was dried with blowing air at 80° C. for 10 minutes, the surface of the formed layer was subjected to a rubbing treatment to form an orientation layer.

The orientation layer was coated with the coating solution having the following components according to the extrusion coating method. By heating the applied solution at 130° C., discotic liquid crystal molecules were aligned.

| Coating solution | |
|---|---|
| The discotic liquid crystal compound in Example 1 | 100 weight parts |
| The following chiral agent | 1.8 weight parts |
| The alignment promoter (I-1) prepared in Synthesis example 2 | 5.0 weight parts |
| A photopolymerization initiator (Irgacure 907, Ciba-Geigy) | 0.2 weight part |
| 2-butane | 185 weight parts |

(Chiral agent)

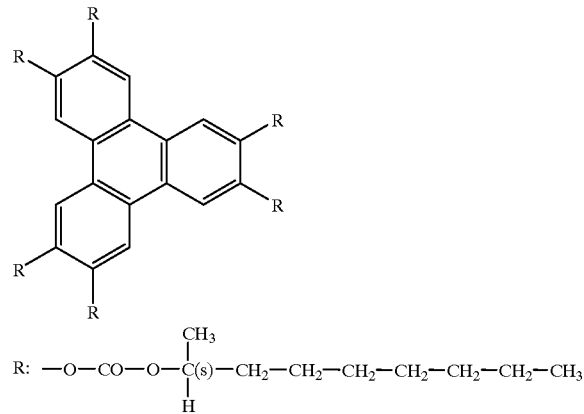

R: $-O-CO-O-\overset{\underset{H}{|}}{\underset{|}{C}}(s)-CH_2-CH_2-CH_2-CH_2-CH_2-CH_2-CH_3$ The formed layer was exposed to ultraviolet light for 4 seconds while heated at 130° C., to polymerize the terminal vinyl group of the discotic liquid crystal molecules and to fix the alignment. Thus an optical compensatory sheet was produced.

The retardation and the thickness of the produced optical compensatory sheet were measured by ellipsometry to determine 180 nm per 2 µm thickness. Further, the alignment of the discotic liquid crystal molecules was observed by means of a polarizing microscope, and thereby it was confirmed that all the molecules were uniformly oriented in monodomain alignment without any defect.

This measurement was further repeated twice. As the result, though there was a slight variation in the retardation per 2 µm thickness (second measurement: 176 nm, third measurement: 170 nm), no defect in the alignment was observed in either measurement.

REFERENCE EXAMPLE 1

The procedure of Application Example 1 was repeated except that the alignment promoter (I-1) was not used, to produce an optical compensatory sheet.

The retardation and the thickness of the produced optical compensatory sheet were measured by ellipsometry to determine 155 nm per 2 µm thickness. Further, the alignment of the discotic liquid crystal molecules was observed by means of a polarizing microscope, and thereby many island-like aligning defects were confirmed.

This measurement was further repeated twice. As the result, there was a considerable variation in the retardation per 2 µm thickness (second measurement: 155 nm, third measurement: 150 nm) and many island-like aligning defects were observed in either measurement.

APPLIED EXAMPLE 2
(Production of liquid crystal display)

An STN liquid crystal cell (twist angle: 240°, Δnd: 880 nm) was prepared. Independently, two optical compensatory sheets produced in Applied Example 1 were laminated so that their optically anisotropic layer sides might face each other and that the director (direction of a normal line of the discotic core plane) of the discotic liquid crystal molecules in one sheet might be identical with that of the liquid crystal molecules in the other sheet. The thus laminated optical compensatory sheets were provided on the bottom of the STN liquid crystal cell, so that the director of the discotic liquid crystal molecules in the sheets might be arranged at the same direction of the director of the rod-like liquid crystal molecules in the cell along the interface between the cell and the sheets. A pair of polarizing plates were then provided in cross-Nicol, to produce a liquid crystal display of an STN mode.

The produced liquid crystal display was compared with a liquid crystal display having no optical compensatory sheet, and thereby it was confirmed that the optical compensatory sheet remarkably enlarged a viewing angle of the liquid crystal cell.

EXAMPLE 2
(Production of optically anisotropic element)

A triacetyl cellulose film (thickness: 100 µm, size: 270 mm×100 mm, Fuji Tac, Fuji Photo Film Co., Ltd.) was used as a transparent support.

The polyimide used in Example 1 was dissolved in a mixed solvent of N-methyl-2-pyrrolidone and 2-butanone in the amount of 5 wt. %. The prepared solution was applied on the transparent support by means of a bar coater. After the applied solution was dried with blowing air at 80° C. for 10 minutes, the surface of the formed layer was subjected to a rubbing treatment to form an orientation layer.

The orientation layer was coated with the coating solution having the following components according to the extrusion coating method.

| Coating solution | |
|---|---|
| 4-Methoxybenzylidene-4-butylaniline (MBBA, rod-like liquid crystal compound) | 100 weight parts |
| The alignment promoter (I-2) prepared in Synthesis Example 3 | 3.0 weight parts |
| 2-butane | 185 weight parts |

By heating the applied solution at the temperature for forming a nematic phase, rod-like liquid crystal molecules were vertically aligned to produce an optically anisotropic element.

The alignment of the rod-like liquid crystal molecules was observed by means of a polarizing microscope while the element was heated and a pair of polarizing plates were provided in cross-Nicol, and thereby it was confirmed that all the molecules were uniformly oriented in monodomain alignment without any defect.

COMPARISON EXAMPLE 2

The procedure of Example 2 was repeated except that he alignment promoter (I-2) was not used, to produce an ptically anisotropic element.

The alignment of the rod-like liquid crystal molecules was observed by means of a polarizing microscope while the element was heated and a pair of polarizing plates were provided in cross-Nicol, and thereby it was confirmed that there were many island-like aligning defects.

COMPARISON EXAMPLE 3
(Production of optically anisotropic element)

The rod-like liquid crystal molecules (N26) forms a nematic phase in the temperature range of 107° C. to 166° C. The rod-like liquid crystal compound (N26) was diluted with chloroform to prepare a solution of about 15 wt. %.

A polyimide orientation layer (LX-1400, Hitachi-Kasei-Du Pont) was provided on a glass substrate, and was subjected to a rubbing treatment. The N26 solution was dropped on the orientation layer, spread by spin-coating at 1,000 rpm, and heated at 120° C. for 1 minute. The alignment of the molecules was observed by means of a polarizing microscope while the element was heated at 120° C., and thereby it was confirmed that there were many reverse tilt domains. In other wards, the liquid crystal molecules were tilted on the interface facing to air and oriented in hybrid alignment along the thickness direction.

EXAMPLE 3
(Production of optically anisotropic element)

The alignment promoter (I-1) prepared in Synthesis Example 2 was added to the rod-like liquid crystal compound (N26) in the amount of 1 wt. %, and the mixture was diluted with chloroform to prepare a solution of about 15 wt. %.

The solution was dropped on the orientation layer used in Comparison Example 3, spread by spin-coating at 1,000 rpm, and heated at 120° C. for 1 minute. The alignment of the molecules was observed by means of a polarizing microscope while the element was heated at 120° C., and thereby it was confirmed that there was no reverse tilt domain. In other wards, the liquid crystal molecules were horizontally aligned on the interface facing to air and homogeneously oriented along the thickness direction.

In addition, it was also confirmed that the alignment promoter (I-1) improved compatibility of the liquid crystal compound so that the liquid crystal composition might be easily applied on the orientation layer without repelling.

EXAMPLE 4
(Production of optically anisotropic element)

The alignment promoter (I-2) prepared in Synthesis Example 3 was added to the rod-like liquid crystal compound (N26) in the amount of 1 wt. %, and the mixture was diluted with chloroform to prepare a solution of about 15 wt. %.

The solution was dropped on the orientation layer used in Comparison Example 3, spread by spin-coating at 1,000 rpm, and heated at 120° C. for 1 minute. The alignment of the molecules was observed by means of a polarizing microscope while the element was heated at 120° C., and thereby it was confirmed that there was no reverse tilt domain. In other wards, the liquid crystal molecules were horizontally aligned on the interface facing to air and homogeneously oriented along the thickness direction.

In addition, it was also confirmed that the alignment promoter (I-2) improved compatibility of the liquid crystal compound so that the liquid crystal composition might be easily applied on the orientation layer without repelling.

EXAMPLE 5
(Production of optically anisotropic element)

The alignment promoter (I-27) was added to the rod-like liquid crystal compound (N26) in the amount of 1 wt. %, and the mixture was diluted with chloroform to prepare a solution of about 15 wt. %.

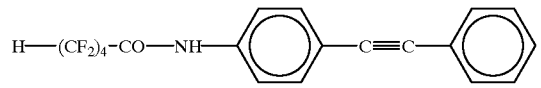

(I-27)

The solution was dropped on the orientation layer used in Comparison Example 3, spread by spin-coating at 1,000 rpm, and heated at 120° C. for 1 minute. The alignment of the molecules was observed by means of a polarizing microscope while the element was heated at 120° C., and thereby it was confirmed that there was no reverse tilt domain. In other wards, the liquid crystal molecules were horizontally aligned on the interface facing to air and homogeneously oriented along the thickness direction.

In addition, it was also confirmed that the alignment promoter (I-27) improved compatibility of the liquid crystal compound so that the liquid crystal composition might be easily applied on the orientation layer without repelling.

COMPARISON EXAMPLE 4
(Production of optically anisotropic element)

A polyimide orientation layer (LX-1400, Hitachi-Kasei-Du Pont) was provided on a glass substrate, and was subjected to a rubbing treatment. A non-polymerizable rod-like liquid crystal composition (ZLI-1132, Merck) was dropped on the orientation layer and spread by spin-coating at 2,000 rpm. The alignment of the molecules was observed at room temperature by means of a polarizing microscope, and thereby it was confirmed that there were many reverse tilt domains. In other wards, the liquid crystal molecules were tilted on the interface facing to air and oriented in hybrid alignment along the thickness direction.

EXAMPLE 6
(Production of optically anisotropic element)

The alignment promoter (I-1) prepared in Synthesis Example 2 was added to the non-polymerizable rod-like liquid crystal composition (ZLI-1132, Merck) in the amount of 1 wt. %.

The mixture was dropped on the orientation layer used in Comparison Example 3 and spread by spin-coating at 2,000 rpm. The alignment of the molecules was observed at room temperature by means of a polarizing microscope, and thereby it was confirmed that there was no reverse tilt domain. In other wards, the liquid crystal molecules were horizontally aligned on the interface facing to air and homogeneously oriented along the thickness direction.

In addition, it was also confirmed that the alignment promoter (I-1) improved compatibility of the liquid crystal compound so that the liquid crystal composition might be easily applied on the orientation layer without repelling.

We claim:

1. A liquid crystal composition comprising liquid crystal molecules and an alignment promoter represented by the formula (I) in an amount of 0.01 to 20 wt. % based on the amount of the liquid crystal molecules:

$$(Hb-)_m L(-Bu)_n \quad (I)$$

in which Hb is a hydrophobic group selected from the group consisting of a fluorine-substituted alkyl group having 1 to 40 carbon atoms, a fluorine-substituted aryl group having 6 to 40 carbon atoms, an alkyl group having 6 to 60 carbon atoms and an alkyl-substituted oligosiloxanoxy group having 1 to 60 carbon atoms; Bu is a bulky group showing an excluded volume effect and comprising at least two rings; L is an (m+n)-valent linking group; and each of m and n is independently an integer of 1 to 12.

2. The liquid crystal composition as defined in claim 1, wherein Hb is a fluorine-substituted alkyl group having 1 to 40 carbon atoms or a fluorine-substituted aryl group having 6 to 40 carbon atoms.

3. The liquid crystal composition as defined in claim 1, wherein each of m and n is 1; L is a divalent linking group selected from the group consisting of an alkylene group, —O—, —CO—, —NR—, —SO$_2$— and a combination thereof; and R is hydrogen or an alkyl group.

4. The liquid crystal composition as defined in claim 1, wherein each of m and n is independently an integer of 2 to 12; and L is a linking group comprising a ring.

5. The liquid crystal composition as defined in claim 1, wherein Bu comprises a tricyclic or tetracyclic condensed ring.

6. The liquid crystal composition as defined in claim 1, wherein the bulky group Bu in the formula (I) comprises at least two rings combined by a single bond, a vinylene bond or an ethynylene bond.

7. The liquid crystal composition as defined in claim 1, wherein the alignment promoter is represented by the formula (Ia):

$$Hb-L-Bu \quad (Ia)$$

in which Hb is a fluorine-substituted alkyl group having 1 to 40 carbon atoms or a fluorine-substituted aryl group having 6 to 40 carbon atoms; Bu is a bulky group showing an excluded volume effect and comprising a tricyclic condensed ring, a tetracyclic condensed ring or at least two rings combined by a single bond, a vinylene bond or an ethynylene bond; L is a divalent linking group selected from the group consisting of an alkylene group, —O—, —CO—, —NR—, —SO$_2$— and a combination thereof; and R is hydrogen or an alkyl group.

8. The liquid crystal composition as defined in claim 1, wherein the liquid crystal molecules are discotic liquid crystal molecules.

9. The liquid crystal composition as defined in claim 1, wherein the liquid crystal molecules are rod-like liquid crystal molecules.

10. The liquid crystal composition as defined in claim 1, wherein the liquid crystal molecules have polymerizable groups.

11. An optically anisotropic element which comprises a liquid crystal layer comprising liquid crystal molecules and an orientation layer provided on only one side of the liquid crystal layer, wherein the liquid crystal layer further contains an alignment promoter represented by the formula (I) in an amount of 0.005 to 0.5 g/m$^2$:

$$(Hb-)_m L(-Bu)_n \quad (I)$$

in which Hb is a hydrophobic group selected from the group consisting of a fluorine-substituted alkyl group having 1 to 40 carbon atoms, a fluorine-substituted aryl group having 6 to 40 carbon atoms, an alkyl group having 6 to 60 carbon atoms and an alkyl-substituted oligosiloxanoxy group having 1 to 60 carbon atoms; Bu is a bulky group showing an excluded volume effect and comprising at least two rings; L is an (m+n)-valent linking group; and each of m and n is independently an integer of 1 to 12.

12. The optically anisotropic element as defined in claim 11, wherein the liquid crystal molecules are aligned at an average inclined angle of 50° to 90°.

13. The optically anisotropic element as defined in claim 11, wherein the liquid crystal molecules are aligned at an average inclined angle of 0° to 50°.

14. The optically anisotropic element as defined in claim 11, wherein the liquid crystal molecules are aligned and polymerized while keeping alignment.

* * * * *